(12) United States Patent
Coe et al.

(10) Patent No.: US 11,474,127 B2
(45) Date of Patent: Oct. 18, 2022

(54) MODULAR SCANNING PROBE MICROSCOPE HEAD

(71) Applicant: Rutgers, The State University of New Jersey, New Brunswick, NJ (US)

(72) Inventors: Angela Coe, Tenstrike, MN (US); Guohong Li, Highland Park, NJ (US); Eva Y. Andrei, Highland Park, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 0 days.

(21) Appl. No.: 17/313,743

(22) Filed: May 6, 2021

(65) Prior Publication Data

US 2021/0349127 A1 Nov. 11, 2021

Related U.S. Application Data

(60) Provisional application No. 63/021,730, filed on May 8, 2020.

(51) Int. Cl.
*G01Q 70/08* (2010.01)
*G01Q 30/20* (2010.01)
*G01Q 10/02* (2010.01)

(52) U.S. Cl.
CPC ............ *G01Q 70/08* (2013.01); *G01Q 10/02* (2013.01); *G01Q 30/20* (2013.01)

(58) Field of Classification Search
CPC ......... G01Q 70/08; G01Q 10/02; G01Q 30/20
USPC .......................... 850/1, 2, 3, 4, 5, 6, 7, 8, 9
See application file for complete search history.

(56) References Cited

U.S. PATENT DOCUMENTS 5,971,254 A * 10/1999 Naud ...................... H01L 24/78
74/490.09

\* cited by examiner

*Primary Examiner* — Nicole M Ippolito
(74) *Attorney, Agent, or Firm* — Wolter Van Dyke Davis, PLLC; Eugene J. Molinelli; Patrick Herron

(57) ABSTRACT

An apparatus, including: a scanning probe microscope head with a frame configured to fit within an insert of a cryostat, and a scanner, a probe and a sample holder all disposed within the frame; and a coarse motor assembly disposed within the frame and comprising: a positionable component; and coarse motors. The coarse motors are configured to move the positionable component relative to the frame along an X axis, a Y axis, and a Z axis. The apparatus further includes a universal electrical base connection with half of a plug/socket arrangement. The plug/socket arrangement is configured to provide electrical communication between the scanning probe microscope head and a base which has a second half of the plug/socket arrangement when the scanning probe microscope head is lowered onto the base.

32 Claims, 27 Drawing Sheets

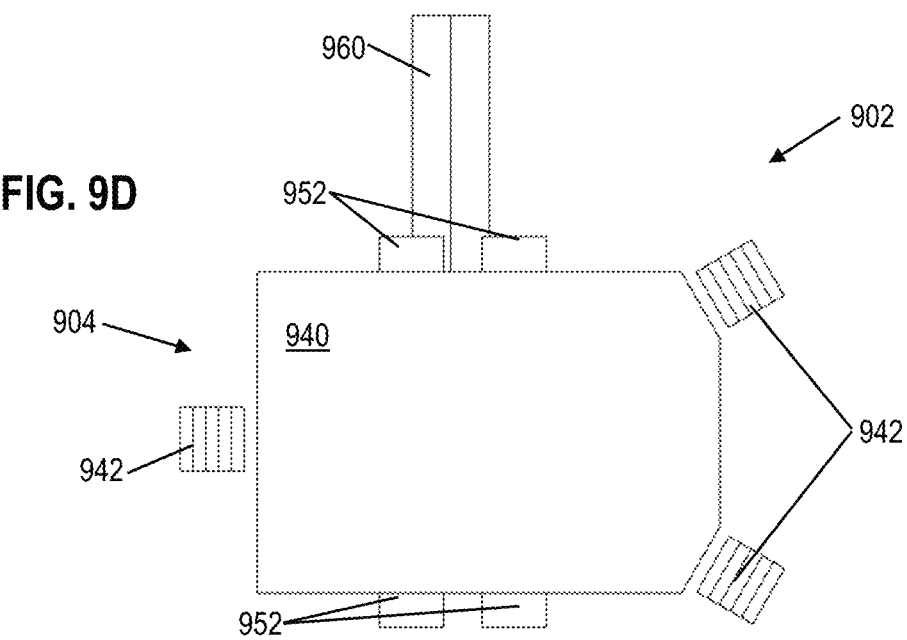
FIG. 9D
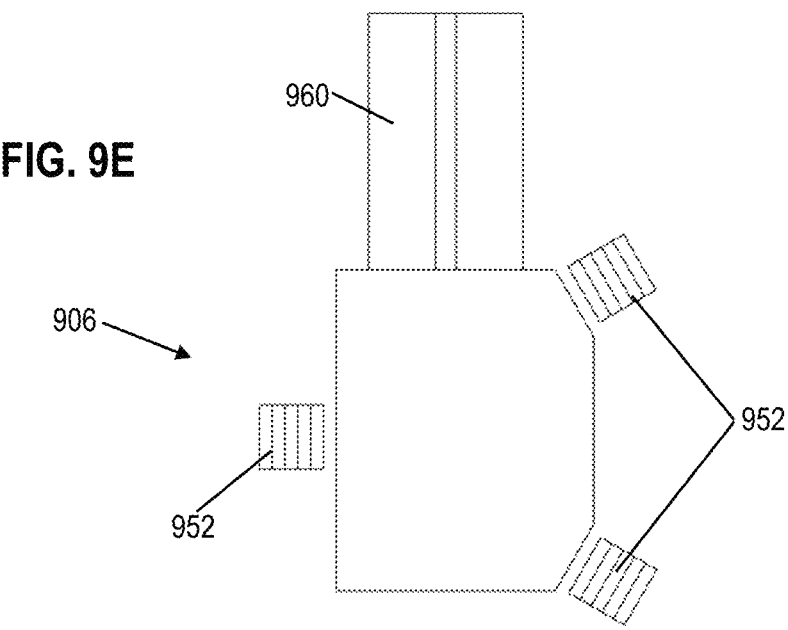
FIG. 9E
FIG. 9F
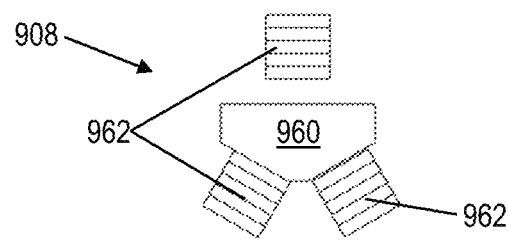

Right Side

Left Side

Rear

Front

Bottom

FIG. 11A
FIG. 11B
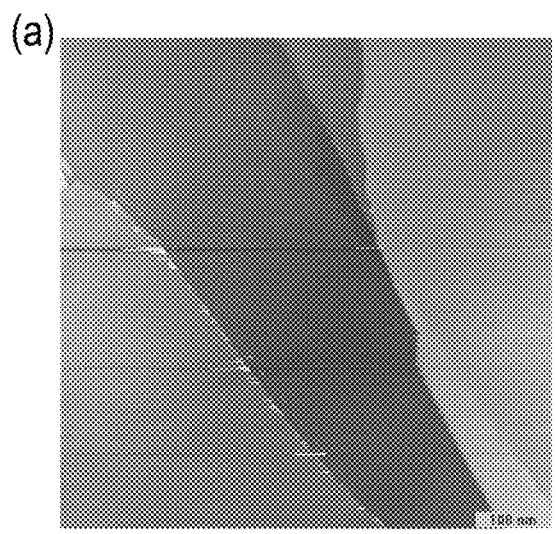
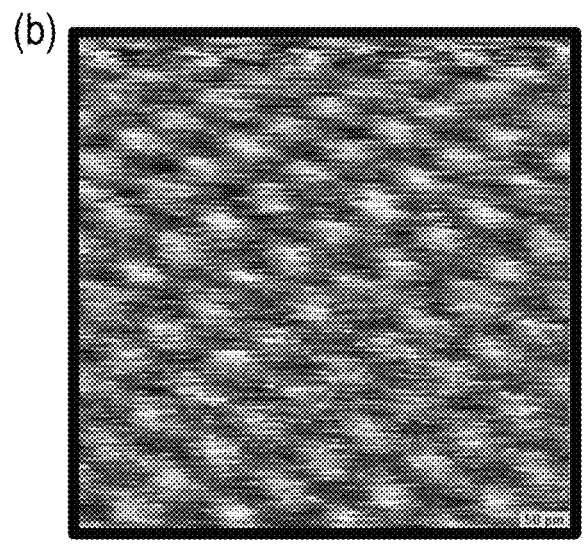
STM on table scanning highly oriented pyrolytic graphite (HOPG). Raw data. Bias voltage of 300mV and current set point of 200pA. Fig. 13A is a large area scan of HOPG showing terraces. Fig. 13B is an atomic resolution scan of HOPG.

MODULAR SCANNING PROBE MICROSCOPE HEAD

CROSS-REFERENCE TO RELATED APPLICATION

This application claims the benefit of U.S. Provisional Patent Application No. 63/021,730, filed on May 8, 2020, which is incorporated by reference herein in its entirety.

STATEMENT OF GOVERNMENTAL INTEREST

This invention was made with government support under Contract No. 1337871 and Contract No. 1842213 awarded by the National Science Foundation. The government has certain rights in the invention.

BACKGROUND

Scanning probe microscope (SPM) systems require a low temperature and vacuum environment to operate successfully. To fulfil this need, SPMs are often operated in a cryostat. The typical SPM system includes an SPM head that is mounted to an SPM base. The SPM system is secured to the bottom of cryogenic insert which is placed inside of a cryostat. Typically, SPM heads are hard wired into their SPM base and have a strong electrical connection that does not permit the SPM head to be removed. Such mounting makes it impossible to remove the SPM system while leaving the cryogenic insert in situ. This is not ideal because it takes a significant amount of time to warm and cool both the cryogenic insert and the SPM system prior to handling them.

Moreover, conventional SPM heads tend to separate their X and Y motors from the Z motors by having the X, Y motors control the motion of the sample and the Z motors control the motion of the scanner (or vice versa). The resulting SPM heads have become bulky and less resistant to vibrational noise to the extent that they are unable to operate without vibration isolation. While this may be less of a problem in conventional cryostats, increasing cryogen prices have encouraged the use of cryogen-free cryostats. Unfortunately, a major issue with cryogen-free cryostats is that pulse tubes used therein create high noise levels which interfere with results. This interferes with the accuracy of the SPM system in general and creates a particular challenge for a scanning tunneling microscope (STM) system, a type of scanning probe microscope system (having an STM head), because an STM is highly sensitive to vibrational noise. Consequently, there is room in the art for improvement.

SUMMARY

In a first set of embodiments, an apparatus, includes: a scanning probe microscope head including a frame configured to fit within an insert of a cryostat, and a probe, a scanner, and a sample holder all disposed within the frame; and a coarse motor assembly disposed within the frame. The coarse motor assembly comprises a positionable component; and coarse motors. The coarse motors comprise: a first motor operatively associated with the frame and configured to move the positionable component along a first axis relative to the frame; and at least one further motor nested inside the first motor and configured to move the positionable component along a second axis and along a third axis relative to the frame, where movement along the first axis effected by the first motor moves the at least one further motor nested therein along the first axis. The apparatus further includes a universal electrical base connection comprising half of a plug/socket arrangement. The plug/socket arrangement is configured to provide electrical communication between the scanning probe microscope head and a base which comprises a second half of the plug/socket arrangement when the scanning probe microscope head is lowered onto the base.

In a second set of embodiments an apparatus, includes: a scanning probe microscope head with a frame configured to fit within an insert of a cryostat, and a probe, a scanner and a sample holder all disposed within the frame; and a coarse motor assembly disposed within the frame and comprising: a positionable component; and coarse motors. The coarse motors are configured to move the positionable component relative to the frame along an X axis, a Y axis, and a Z axis. The apparatus further includes a universal electrical base connection with half of a plug/socket arrangement. The plug/socket arrangement is configured to provide electrical communication between the scanning probe microscope head and a base which has a second half of the plug/socket arrangement when the scanning probe microscope head is lowered onto the base.

In a third set of embodiments, an apparatus includes: a scanning probe microscope head including a frame configured to fit within an insert of a cryostat, and a probe, a scanner, and a sample holder all disposed within the frame; and a universal electrical base connection including half of a plug/socket arrangement. The plug/socket arrangement is configured to provide electrical communication between the scanning probe microscope head and a base which includes a second half of the plug/socket arrangement when the scanning probe microscope head is lowered onto the base.

In a fourth set of embodiments, an apparatus includes: a scanning probe microscope coarse motor assembly, including: a positionable component; and coarse motors configured to be operatively associated with an external component and configured to move the positionable component along an X axis, along a Y axis, and along a Z axis relative to the external component and within the external component.

In a fifth set of embodiments, an apparatus includes: a scanning probe microscope coarse motor assembly, including: a positionable component; and coarse motors. The coarse motors include: a first motor operatively associated with an external component and configured to move the positionable component along a first axis relative to the external component and within the external component; and at least one further motor nested inside the first motor and configured to move the positionable component along a second axis and along a third axis relative to the external component. Movement along the first axis effected by the first motor moves the at least one further motor nested therein along the first axis.

In a sixth set of embodiments, an apparatus includes: a scanning probe microscope coarse motor assembly, including: a positionable component; and coarse motors configured to be operatively associated with an external component and including a Z piezo stack configured to move the positionable component along a Z axis relative to the external component, and at least one piezo stack configured to move the positionable component along an X axis and along a Y axis relative to the external component.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which:

FIG. 9D shows the X motor, the Y motor, and the Z motor taken along D-D shown in FIG. 9C;

FIG. 9E shows the Y motor and the Z motor taken along E-E shown in FIG. 9C;

FIG. 9F shows the Z motor taken along F-F shown in FIG. 9C;

FIGS. 11A and 11B show example scans made using the scanning probe microscope on a tabletop without the vibration isolation provided by the SPM base.

DETAILED DESCRIPTION

Figure 1A:
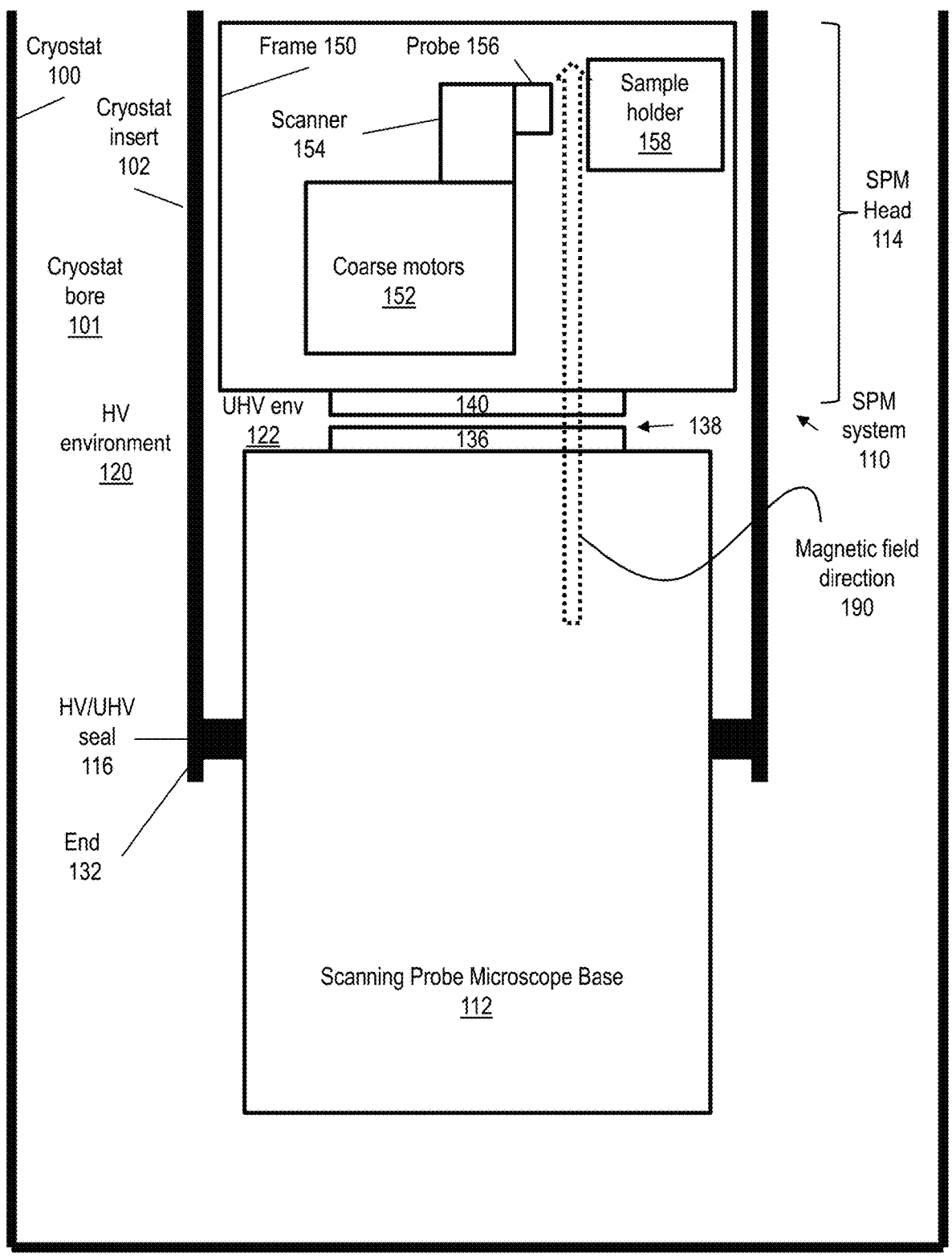
FIG. 1A is a block diagram that illustrates an example embodiment of the SPM head installed in a cryostat insert of a cryostat as part of an SPM system.

A method and apparatus are described for a modular scanning probe microscope head (SPM head) of a scanning probe microscope system (SPM system) that further includes a scanning probe microscope base (SPM base). In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5 X to 2 X, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of use with a scanning tunneling microscope used in a cryogen-free cryostat. However, the invention is not limited to this context. In other embodiments, the invention can be used with any sort of scanning probe microscope or even other suitable tools that require a compact head of this nature. Likewise, the head can be used in any sort of cryostat or any suitable environment, including non-vacuum environments. (US application number 62/661,924 filed Apr. 24, 2018 which is hereby incorporated in its entirety (PCT Patent Application No. PCT/US19/27929 (RU No. 2018-090)) for transferring the SPM from room temperature to low temperature.)

1. Overview

The inventors have created a scanning probe microscope system (SPM system) having a modular SPM base and a modular SPM head. The SPM base connectable to the end of a cryostat insert of existing cryogen-free cryostats. The SPM base is disposed between the end of the cryostat insert and the SPM head, thereby isolating the SPM head from vibrational noise present in the end of the cryostat insert. The SPM base is an internal vibration isolation base that dampens vibrational noise present in the end of the cryostat insert so that vibrational noise reaching the SPM head is level low enough to operate the SPM system. In particular, the vibrational noise is reduced enough to operate scanning tunnel microscopes STM, a type of SPM having an STM head that is particularly susceptible to vibrational noise.

The SPM head/STM head is compact, stable, and transferable. While its use is not limited to operating in high vacuum (HV) and ultra-high vacuum (UHV) environments, in these settings this allows for the SPM head to be moved between atmospheric pressure and the ultra-high vacuum UHV environment, transferred between UHV environment chambers, assembled at room temperature in an UHV environment with optical access using a probe transfer mechanism, modified to interchange the SPM head from a scanning tunneling microscope (STM) module to an atomic force microscope (AFM) module to a magnetic force microscope (MFM) module all in situ, and transferred into a low temperature region with high magnetic fields for running experiments. In an example embodiment, a range for the HV environment 120 is 1×10−3 torr to 1×10−8 torr. In an example embodiment, a range for the UHV environment 122 is 1×10−8 torr to 1×10−12 torr.

For low temperature SPM system experiments where magnetic fields are applied, the SPM head sits inside the bore of a cooled superconducting magnet. The bore has a small diameter with limited space for the SPM head. This imposes restrictions on the design of the SPM head and cause the conventional SPM head to always be oriented such that the sample and probe are out-of-plane (perpendicular) to a direction of the applied magnetic field. The conventional SPM head design is limited in this way due to the bulky nature of the X, Y, and Z coarse motors and the scanner. But researchers require the ability to apply magnetic fields in more than just the perpendicular direction. To meet this need, superconducting vector magnet systems typically need to be purchased to support magnetic fields applied in varying directions to the sample with in-plane (parallel) magnetic fields reaching up to 3 T. Unfortunately, the addition of the vector magnets is expensive and requires major alterations to a system. Additionally, in-plane magnetic fields of 3 T are too small for many experiments. To resolve this, the SPM head disclosed herein is equipped with a new, compact coarse motor system that fits within the SPM head.

This permits an SPM head/SPM system that orients the sample parallel (in-plane) to the applied magnetic field of a superconducting magnet while also keeping the coarse X, Y, and Z directions decoupled, providing ideal probe and sample navigation. A benefit of this invention is that the system is not altered [the superconducting vector magnet is no longer needed]. Since only the SPM head is changed, the researcher's system is not altered, reducing labor hours and costs required in breaking down the system, including the cryostat, and reinstalling the system. Instead this new SPM head can be used with the researcher's current superconducting magnet. Using this new SPM head, the magnetic field applied can be up to the maximum available from the superconducting magnet, exceeding the 3T limit.

As can be seen in FIG. 1A, a cryostat 100 includes a bore 101 into which is inserted a cryostat insert 102. The scanning probe microscope SPM system 110 includes an SPM base 112 and an SPM head 114 mounted atop the SPM base 112. An HV/UHV seal 116 separates a high vacuum (HV) environment 120 in the cryostat 100 from an ultra-high vacuum (UHV) environment 122 inside the cryostat insert 102. It is the UHV environment 122 in which the SPM head 114 operates. It is the HV environment in which the remaining equipment and connections are made. The HV/UHV seal 116 enables the UHV environment 122 to remain clean for performing experiments with the SPM head and the HV environment 120 can be used for wiring and exchange gas cooling. This streamlines the UHV process.

In an example embodiment, the SPM base 112 is configured to be secured to the end 132 of the cryostat insert 102. A top of the SPM base 112 is configured to be connected to the SPM head 114 via a universal electrical connection 138. Half 136 of the universal electrical connection 138 is disposed on the SPM base 112 and connects to a second half 140 of the universal electrical connection 138 that is disposed on the SPM head 114.

In some embodiments, the SPM head 114 is constructed to be compact and relatively rigid. This keeps it from being susceptible to low frequency noise vibrations but makes it susceptible to high frequency noise vibrations. In an example embodiment, the natural frequency of the SPM head 114 should be not less than 500 Hz. Hence, in some embodiments, the SPM base 112 may act as a low pass filter for vibrational noise, thereby mitigating high frequency noise vibrations.

Figure 1B:
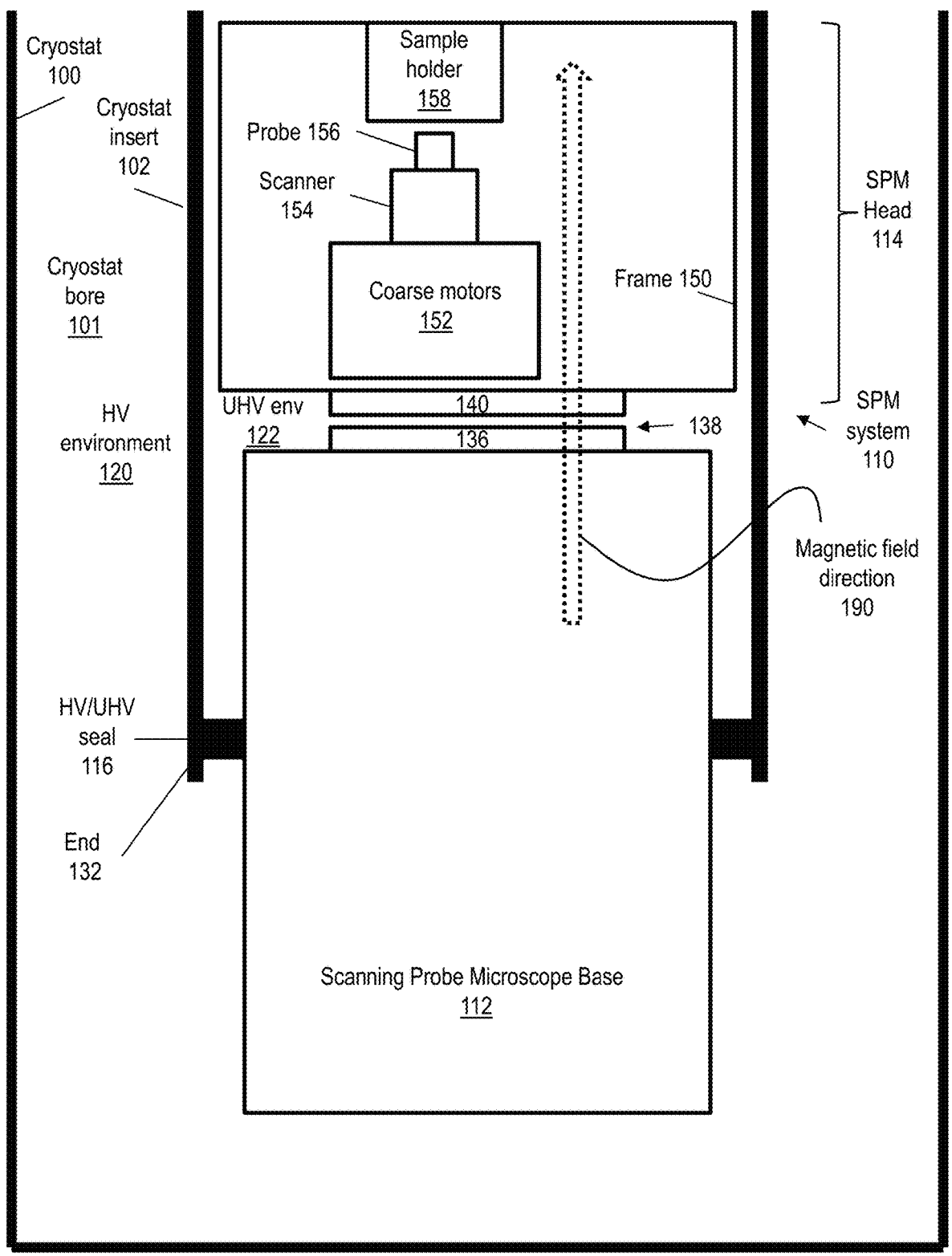
FIG. 1B is a block diagram that illustrates an alternate example embodiment of the SPM head installed in a cryostat insert of a cryostat as part of an SPM system.

The SPM head 114 includes a frame 150 and within the frame 150: coarse motors 152, scanner 154, a probe 156, and a sample holder 158. In the illustrated embodiment, the sample face is parallel and the probe perpendicular to the applied magnetic field direction 190, and the probe 156 is positioned to the side of the sample holder 158. This configuration is advantageous for certain measurements. In other embodiments, such as that shown in FIG. 1B, the sample holder 158 and probe 156 are mounted at a different or variable orientation relative to the applied magnetic field direction 190. The sample holder 158 may be secured to the frame 150. The coarse motors 152 execute coarse positioning of the scanner 154 and thereby of the probe 156. This enables the probe 156 to properly probe a sample that is in the stationary/fixed sample holder 158.

Figure 2A:
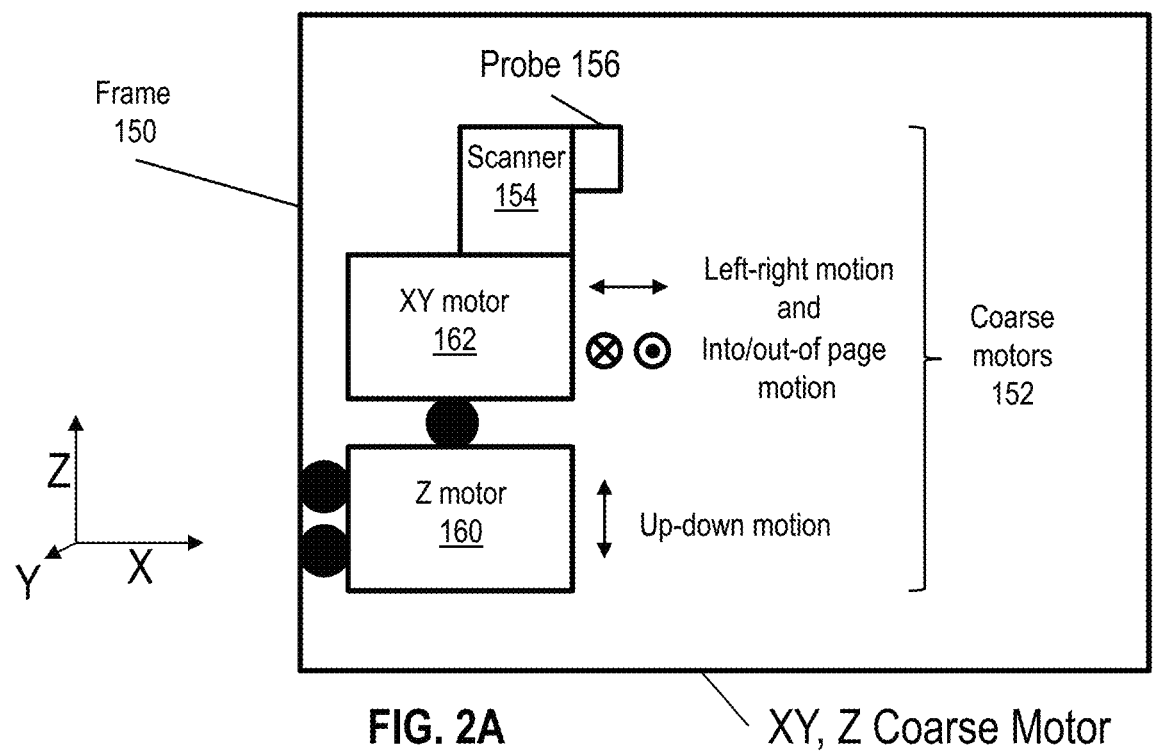
FIG. 2A and FIG. 2B are block diagrams that illustrate motions of respective example embodiments of coarse motors of the SPM head.
Figure 2B:
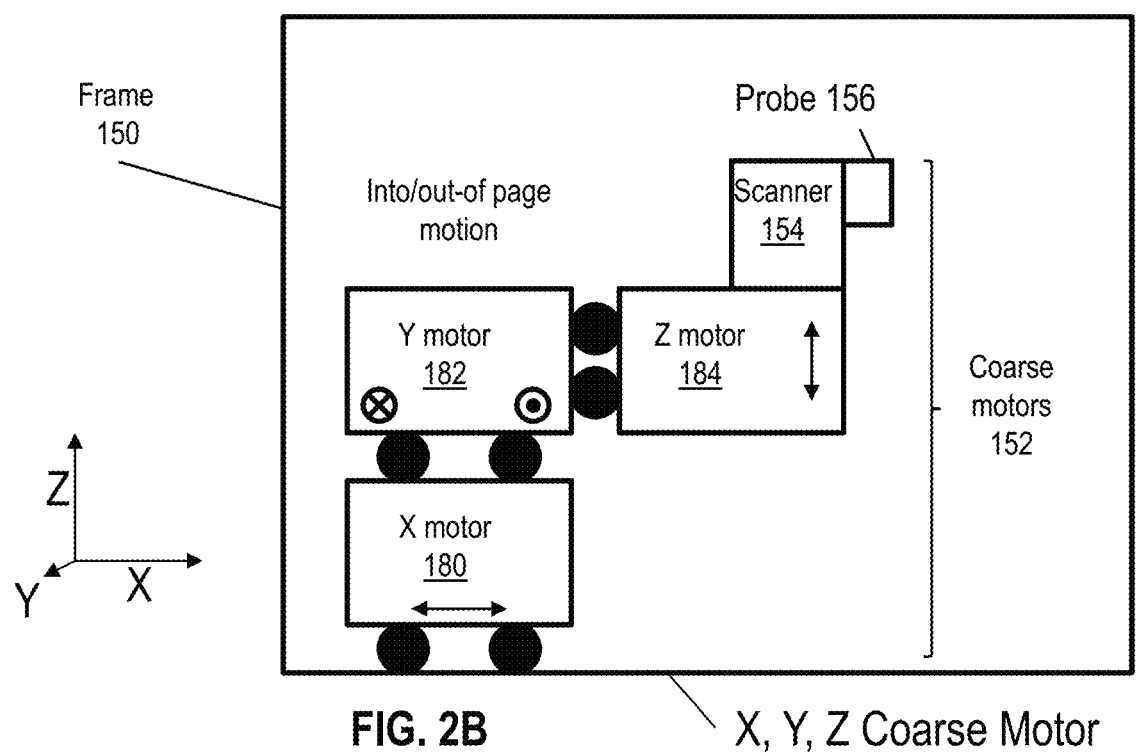

FIG. 2A and FIG. 2B are block diagrams that illustrate different example embodiments of the coarse motors 152. FIG. 2A and FIG. 2B represent the motions imparted by the motors as opposed to the structure of the motors. FIG. 2A shows an example embodiment of the coarse motors 152 having a Z motor 160 and a combined XY motor 162. The Z motor 160 generates movement along the Z axis (up-down as shown) relative to the frame 150. The XY motor 162 is associated with the Z motor 160 such that movement of the Z motor 160 along the Z axis also moves the XY motor 162 along the Z axis. The XY motor 162 generates movement along the X axis (left-right as shown) as well as along the Y axis (in and out of the page as shown). The scanner 154 and the probe 156 are associated with the XY motor 162. As such, the coarse motors 152 can move the scanner 154 and the probe 156 along the X, Y, and Z axes into a suitable position for scanning a sample in the sample holder 158, which may be held in a fixed position. In a variation, the Z motor 160 and the XY motor 162 could swap positions such that the XY motor 162 moves along the frame 150 and takes the Z motor 160 with it.

FIG. 2B shows another example embodiment of the coarse motors 152. In this embodiment, the X motor 180 moves in the X direction (left-right as shown) relative to the frame. The Y motor 182 is associated with the X motor 180 such that movement of the X motor 180 along the X axis moves the Y motor 182 along the X axis. The Y motor 182 generates movement along the Y axis (in and out of the page as shown). The Z motor 184 is associated with the Y motor 182 such that movement of the Y motor 182 along the Y axis moves the Z motor 184 along the Y axis. The Z motor 184 generates movement along the Z axis (up-down as shown). The scanner 154 and the probe 156 are associated with the Z motor 184. As such, the coarse motors 152 can move the scanner 154 and the probe 156 along the X, Y, and Z axes into a suitable position for scanning a sample in the sample holder 158. In variations, the motors can be rearranged in a variety of configurations to achieve similar positioning of probe 156. For example, not meant to be limiting, the Y motor 182 and the Z motor 184 may be swapped. Further, the X motor 180 and the Y motor 182 may be swapped, or the X motor 180 and the Z motor 184 may be swapped. The artisan will appreciate that any arrangement that follows the disclosed principles will be suitable.

Figure 2C:
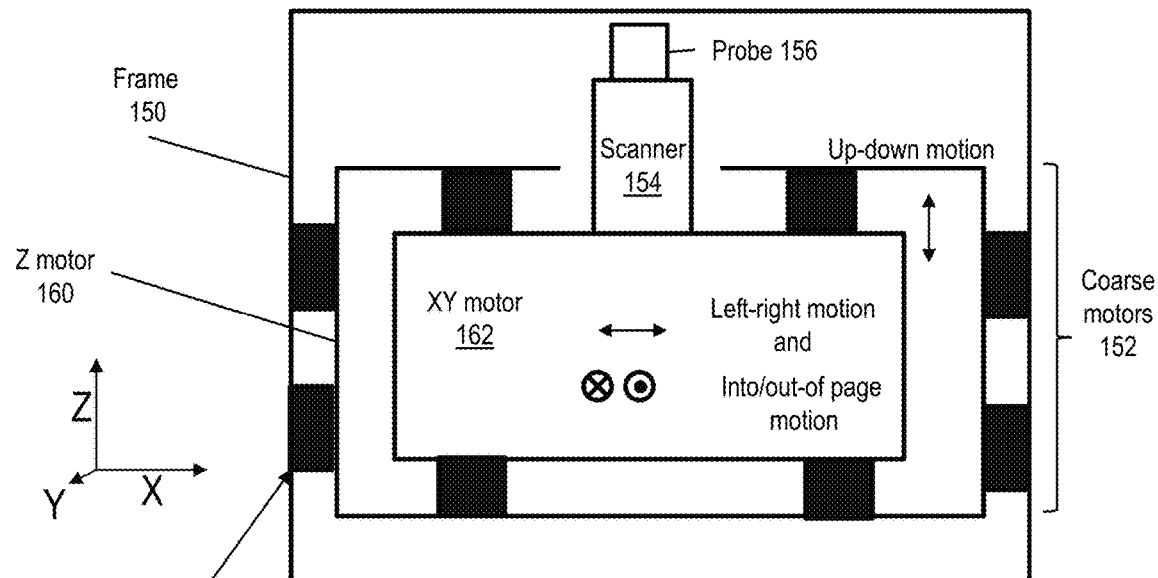
FIG. 2C is a block diagram that illustrates an example embodiment of a nested structure capable of generating the movement illustrated in FIG. 2A.

FIG. 2C is a block diagram that illustrates an example embodiment of a nested structure capable of generating the movement illustrated in FIG. 2A. FIG. 2C shows the Z motor 160 is able to move in the Z direction relative to the frame 150 via at least one stack of piezoelectric shear plates 196. The XY motor 162 is nested within the Z motor 160 and therefore moves with the Z motor 160. The XY motor 162 is able to move in the X direction and the Y direction via its own at least one stack of piezoelectric shear plates 196. Hence, the XY, Z motor can move the scanner 154 in the X, Y, and Z directions. The embodiments of the coarse motors represented in FIG. 2C can be used in the SPM head shown in FIG. 1A and in the SMP head shown in FIG. 1B.

A piezo stack may be energized and thereby change shape. This shape change moves the associated motor in an associated direction to a new position. The energy may be quickly removed which causes the piezo stack to snap back to its original shape. Since the motor has inertia, it does not snap back, but instead remains in the new position. This process can be repeated, similar to how a caterpillar moves, to move the motor in the respective direction the desired distance.

Figure 2D:
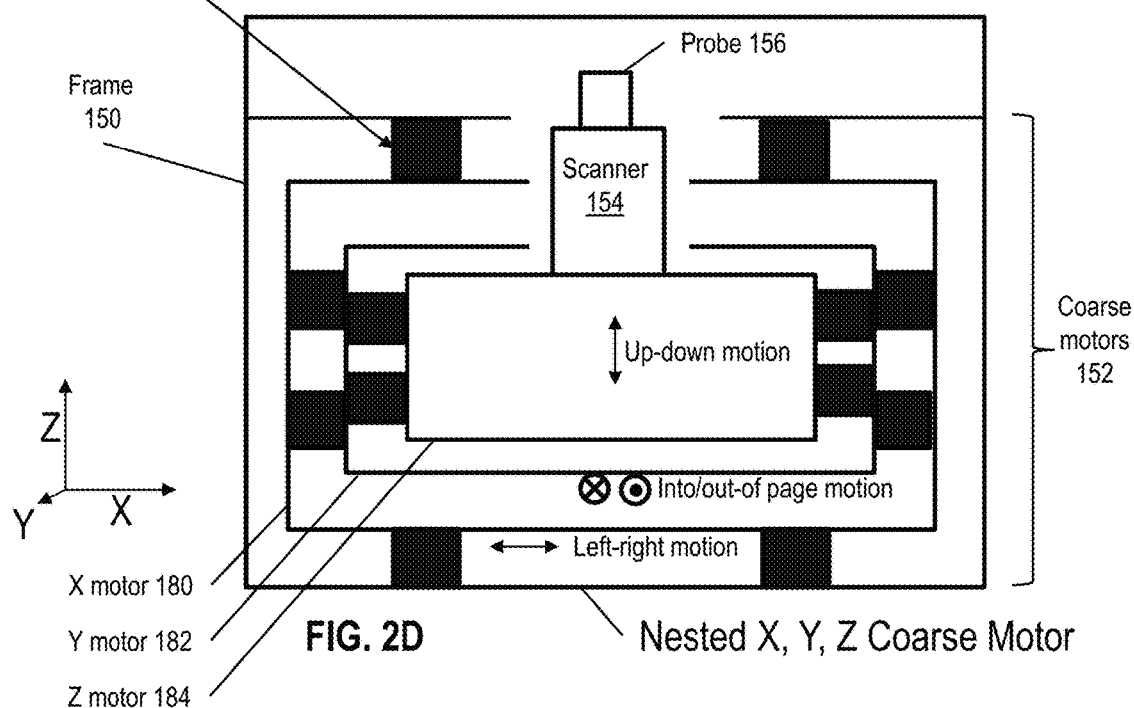
FIG. 2D is a block diagram that illustrates an example embodiment of a nested structure capable of generating the movement illustrated in FIG. 2B.

FIG. 2D is a block diagram that illustrates an example embodiment of a nested structure capable of generating the movement illustrated in FIG. 2B. FIG. 2D shows the X motor 180 is able to move in the X direction relative to the frame 150 via at least one stack of piezoelectric shear plates 196. The Y motor 182 is nested within the X motor 180 and therefore moves with the X motor 180. The Y motor 182 moves in the Y direction via its own at least one stack of piezoelectric shear plates 196. The Z motor 184 is nested within the Y motor 182 and therefore moves with the Y motor 182 and with the X motor 180. The Z motor 184 moves in the Z direction via its own at least one stack of piezoelectric shear plates 196. Hence, the X, Y, Z motor can move the scanner 154 in the X, Y, and Z directions. The embodiments of the coarse motors represented in FIG. 2D can be used in the SPM head shown in FIG. 1A and in the SMP head shown in FIG. 1B.

Figure 3A:
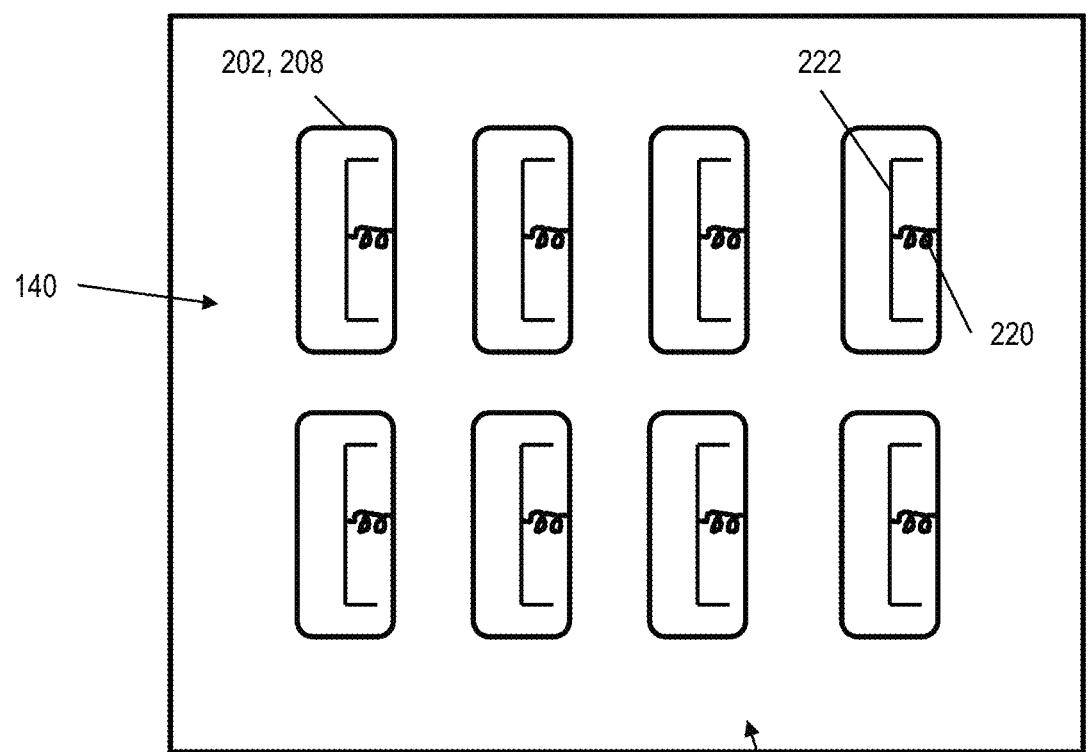
FIG. 3A is a block diagram that illustrates an example embodiment of second half of the universal electrical connection having a pattern of sockets.
Figure 3B:
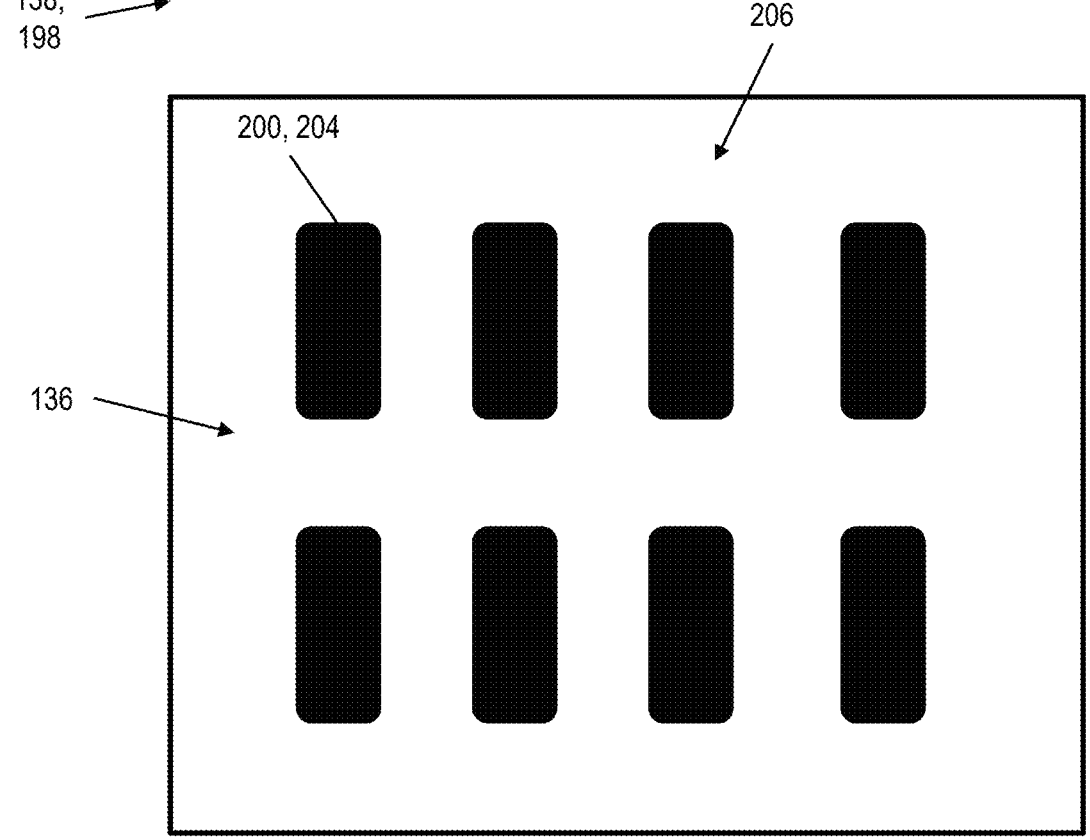
FIG. 3B is a block diagram that illustrates an example embodiment of first half of the universal electrical connection having a matching pattern of plugs.

As can be seen in FIG. 3A and FIG. 3B, in an example embodiment, the universal electrical connection 138 includes a plug/socket arrangement 198. One of the halves, for example the first half 136, may include at least one plug 200 and the other half may include a respective cooperating socket/receptacle 202 for each plug. Each plug 200 may be a pin 204 or other male connector known to the artisan. The socket 202 is configured to cooperate with a size and shape of a respective plug 200 to receive the respective plug 200 therein. The socket 202 may be any appropriate female socket 208 known to the artisan. When the plug 200 is installed in the socket 202, electrical communication is established between the SPM base 112 and the SPM head 114. In an example embodiment, half of the plug/socket arrangement comprises a plurality of pins 204 disposed in a pattern 206 and the other half includes a plurality of female sockets 208 disposed in the pattern 206 and configured to receive the plurality of pins 204 therein.

In an example embodiment, the socket 202 optionally includes a spring 220 and a contact 222 configured to press on the plug 200. For example, the spring 220 may press on a side of the plug 200 as the plug 200 is inserted. The interaction results in a spring frictional force that resists the insertion of the plug 200 into the socket 202. Each socket 202 may exhibit a respective resistance force to insertion of the plug 200. For each socket 202 with such a spring 220 the resistance force includes the spring frictional force. The first half 136 and the second half 140 will properly engage and establish the electrical communication as long as a total of all the respective resistance forces is less than an engagement force available to install the SPM head 114 onto the SPM base 112. In an example embodiment, in addition to the weight of the SPM head 114, an additional engagement force is applied to complete the engagement. The additional engagement force may be applied via a mechanism used to deliver the SPM head 114 to the SPM base 112 in the cryostat insert 102. For example, a stiffness of a cable on which the SPM head 114 is suspended may be used to exert the additional engagement force necessary to engage the universal electrical connection 138. In an example embodiment, the total engagement force necessary to engage the universal electrical connection 138 is up to 350 grams. In an example embodiment, the total engagement force is 300 grams.

In another example embodiment, the only force available to install the SPM head 114 is the weight of the SPM head 114. In such an embodiment, the total of all the respective resistance forces would be less than the weight of the SPM head 114.

Although equipment is depicted in FIG. 1A, FIG. 1B, FIG. 2A, FIG. 2B, FIG. 2C, and FIG. 2D as integral blocks in a particular arrangement for purposes of illustration, in other embodiments one or more structures, or portions thereof, may be arranged in a different manner and/or may be separated out of the shown block.

2. Example Embodiments

Figure 4A:
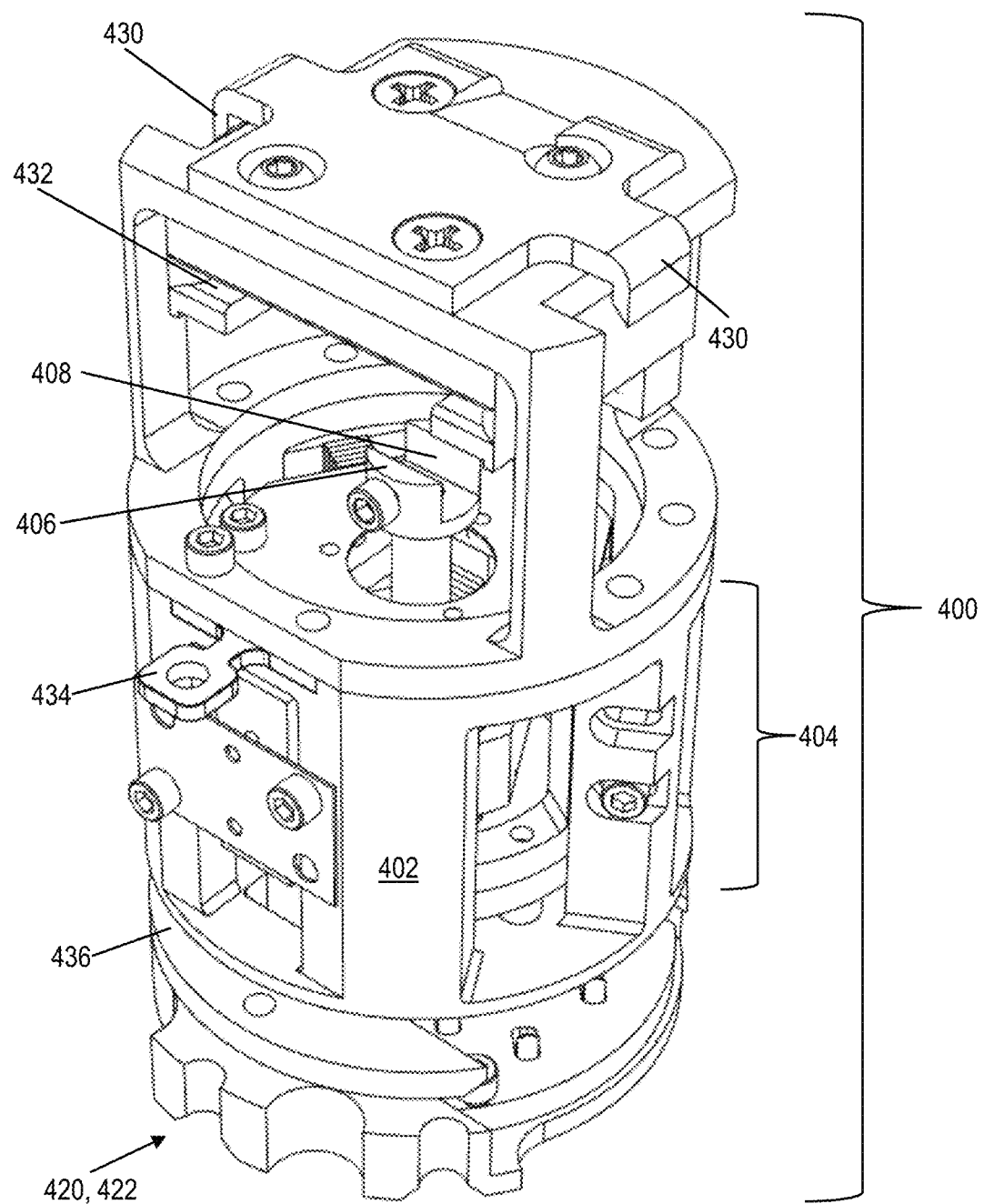
FIG. 4A shows an example embodiment of an SPM head with an example embodiment of coarse motors having a Z motor and a combined XY motor as represented in FIG. 2A and FIG. 2C.
Figure 4B:
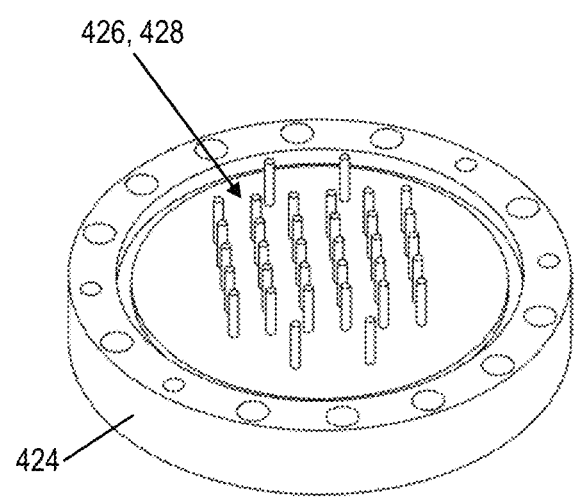
FIG. 4B shows an example embodiment of the base having half of an example embodiment of a universal connection suitable for use with the SPM head of FIG. 4A.

FIG. 4A to FIG. 4D show an example embodiment of an SPM head 400. As can be seen in FIG. 4A and FIG. 4B, the SPM head 400 includes a frame 402 and within the frame 402 includes coarse motors 404, scanner 406, and a probe receiver 408. (In this example embodiment, the probe would be positioned under the sample holder. Alternately, the probe can be positioned beside the sample holder.) The SPM head 400 further includes an SPM electrical connector 420 that forms the second half 422 of the universal electrical connection between the SPM head 400 and the base 424. The base 424 has a base electrical connector 426 that forms the first half 428 of the universal electrical connection. The SPM head 400 further includes transfer handles 430 suitable for use with a transfer mechanism, a horizontal sample receiver 432 suitable for receiving a sample holder, an SPM Wobble stick handle 434 suitable for being grabbed by a Wobble stick, and a groove 436 suitable for receiving a robotic arm fork.

Figure 4C:
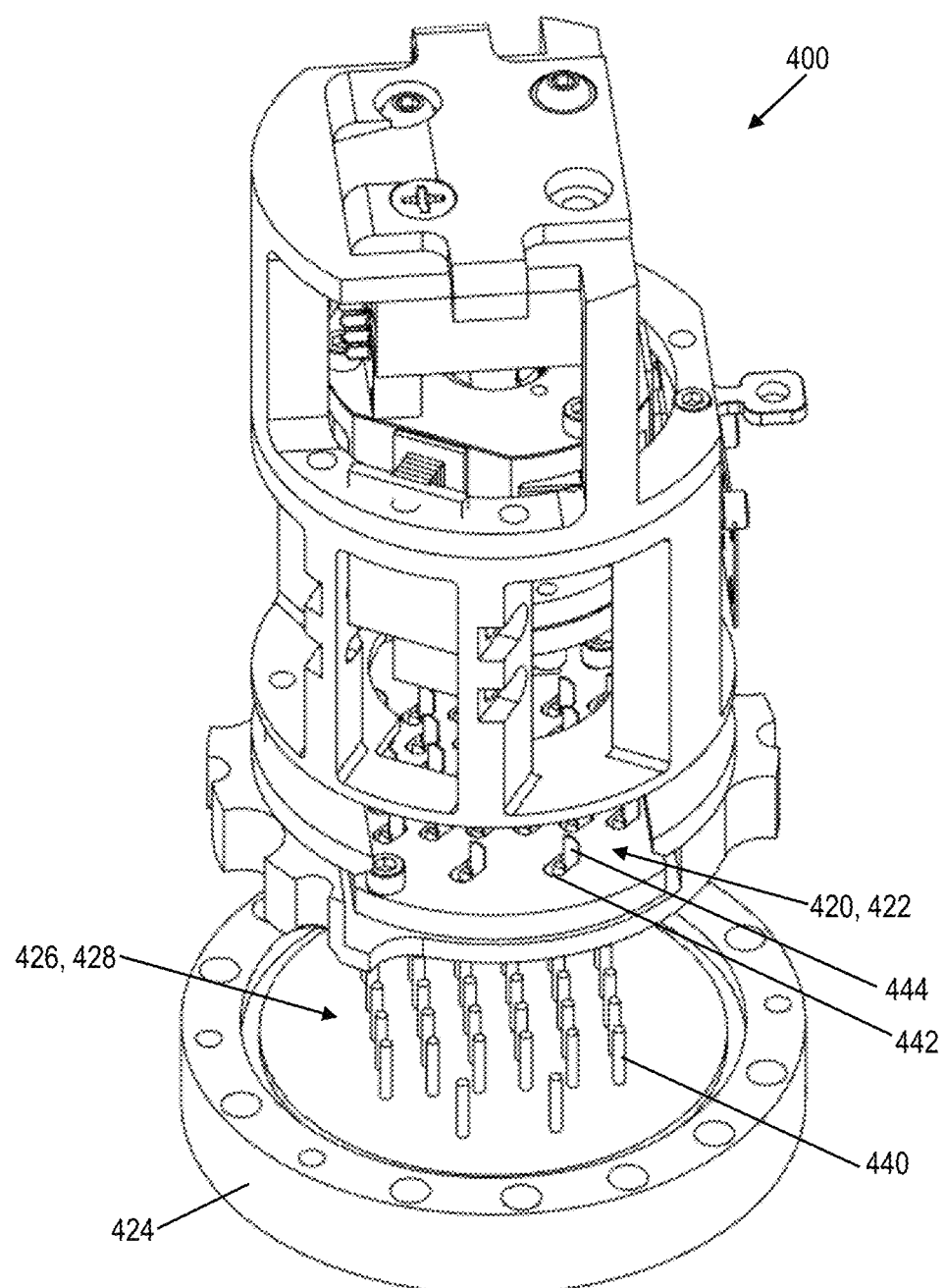
FIG. 4C shows the SPM head of FIG. 4A being lowered onto the base of FIG. 4B.

FIG. 4C shows the SPM head 400 of FIG. 4A being lowered onto the base 424 of FIG. 4B. Pins 440 of the base electrical connector 426 are configured to be received by slots 442 of the SPM electrical connector 420 and are configured to be retained therein by spring-loaded tabs 444.

Figure 4D:
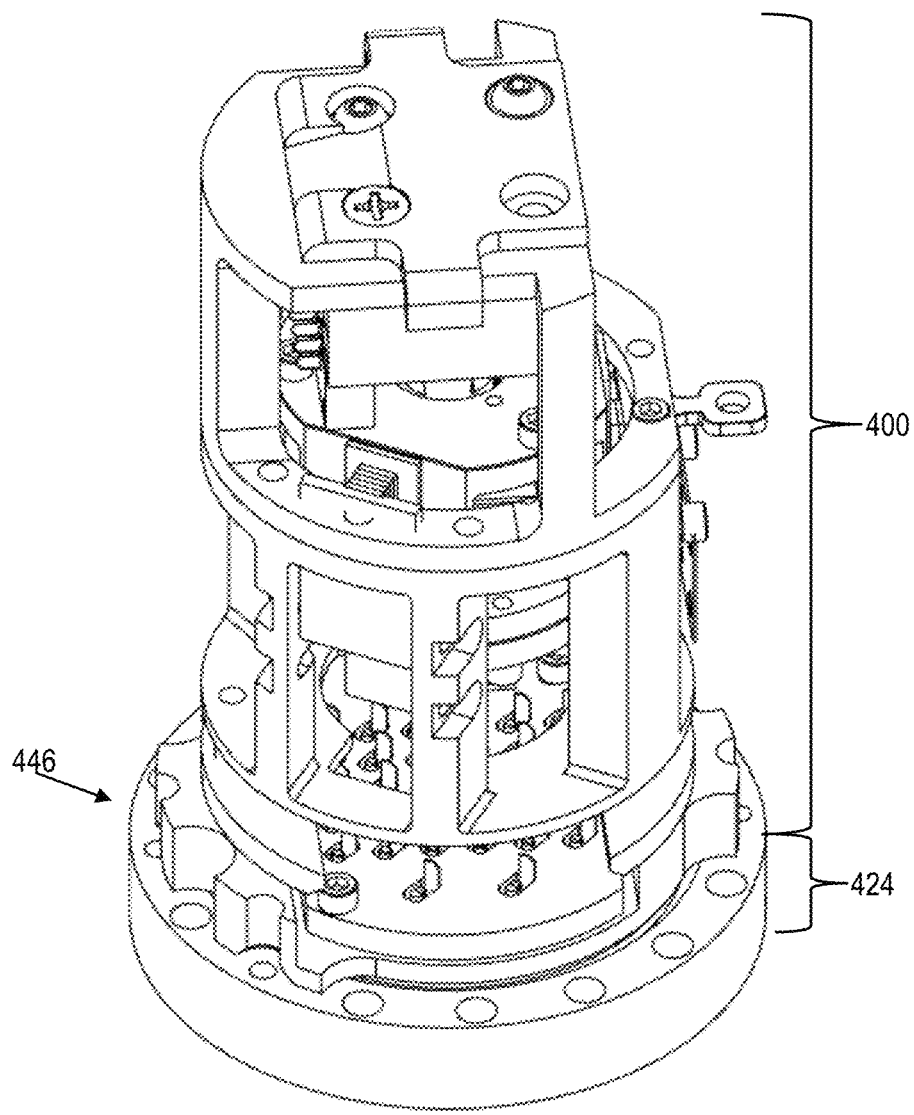
FIG. 4D shows the SPM head of FIG. 4A engaged with the base of FIG. 4B.

FIG. 4D shows the SPM head 400 of FIG. 4A engaged with the base 424 of FIG. 4B. When assembled as shown, the universal electrical connection 446 therebetween is formed.

Figure 5:
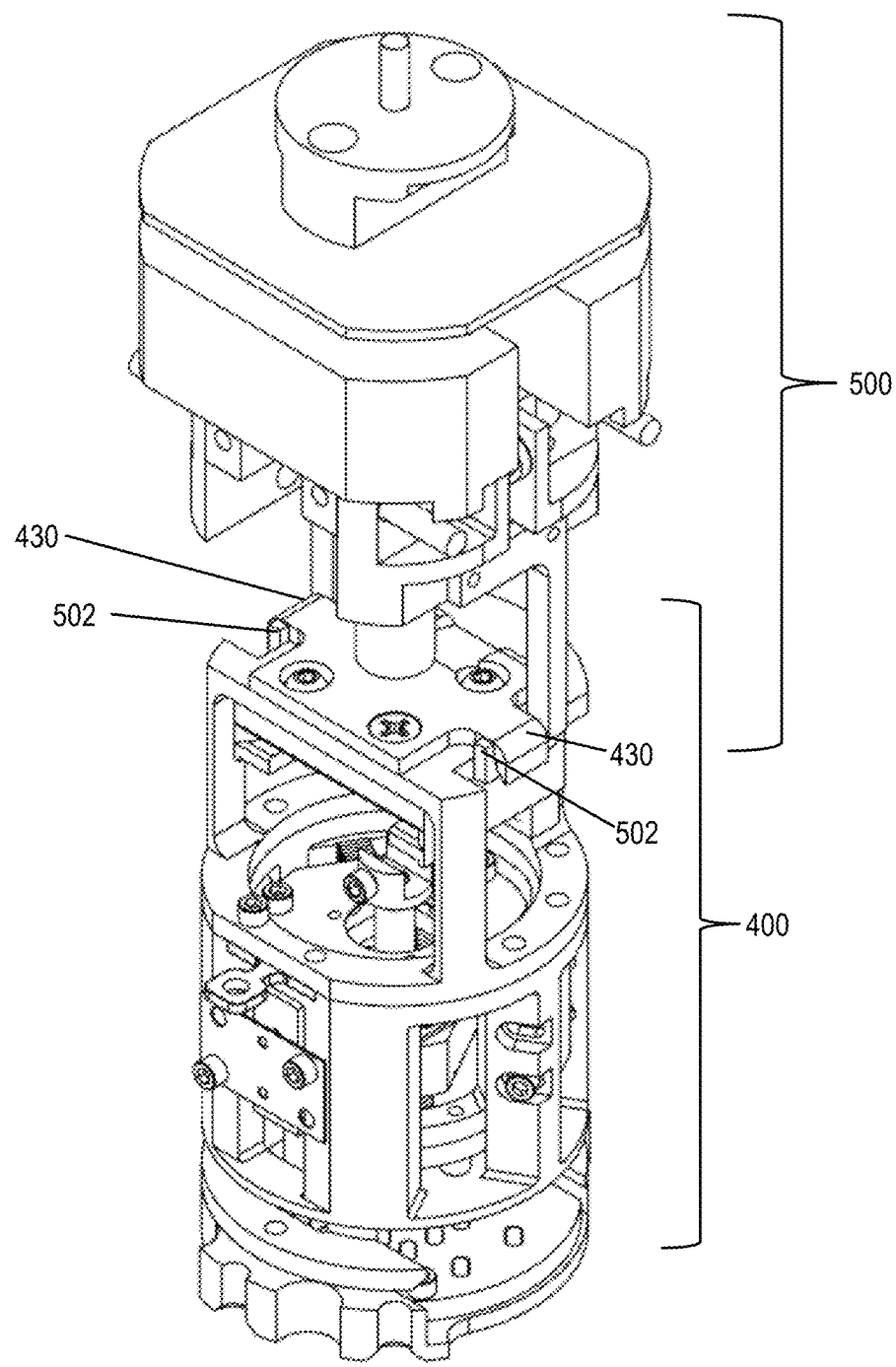
FIG. 5 shows the SPM head of FIG. 4A being transferred via an example embodiment of a low-profile transfer mechanism interacting with an example embodiment of transfer handles on the SPM head.

FIG. 5 shows the SPM head 400 of FIG. 4A being transferred via an example embodiment of a low-profile transfer mechanism 500 having transfer hooks 502 that interact with the transfer handles 430 on the SPM head 400.

Figure 6:
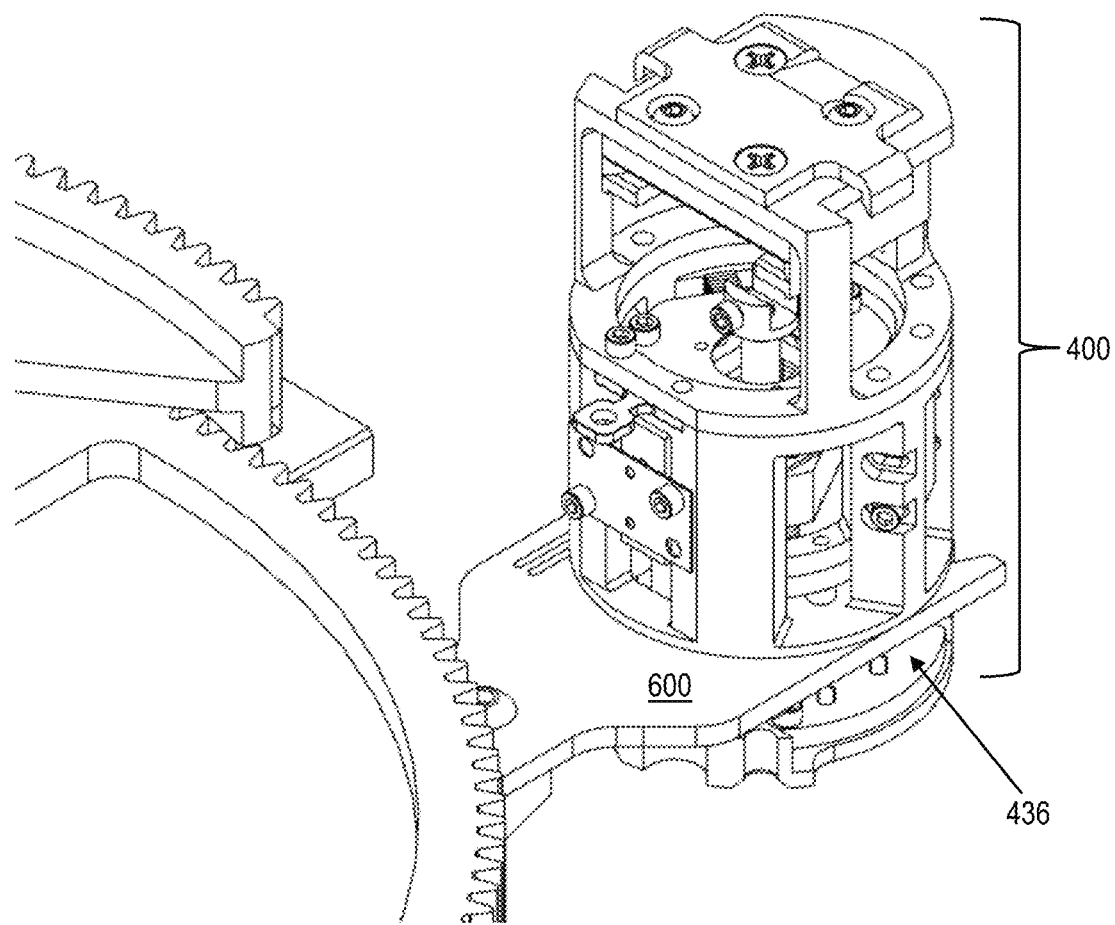
FIG. 6 shows the SPM head of FIG. 4A being transferred via an example embodiment of a robotic arm fork interacting with an example embodiment of a groove on the SPM head.

FIG. 6 shows the SPM head 400 of FIG. 4A being transferred via an example embodiment of a robotic arm fork 600 interacting with the groove 436 on the SPM head 400.

Figure 7:
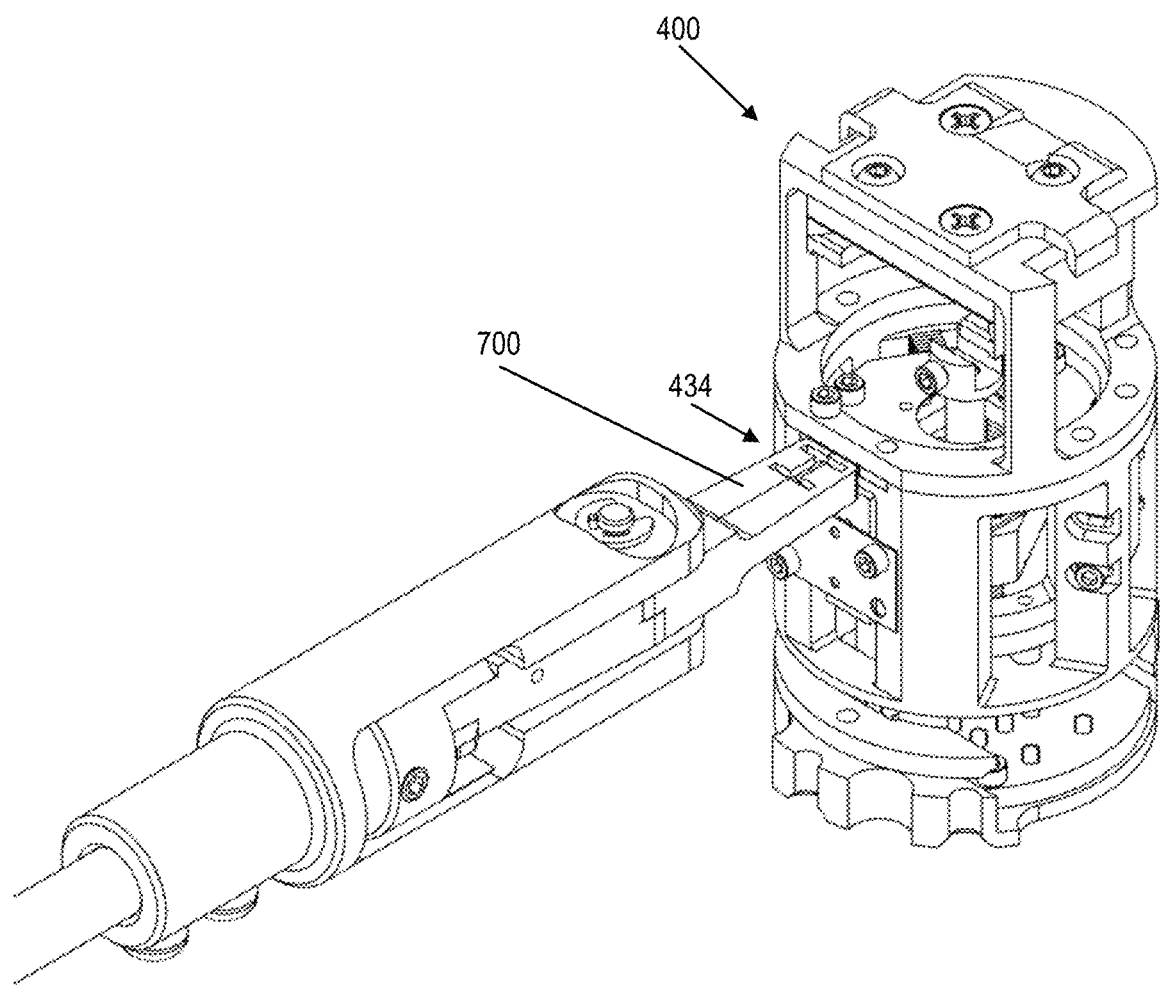
FIG. 7 shows the SPM head of FIG. 4A being transferred via an example embodiment of a Wobble stick grabbing an example embodiment of a Wobble stick handle on the SPM head.

FIG. 7 shows the SPM head 400 of FIG. 4A being transferred via an example embodiment of a Wobble stick 700 grabbing the SPM Wobble stick handle 434 on the SPM head 400.

Figure 8A:
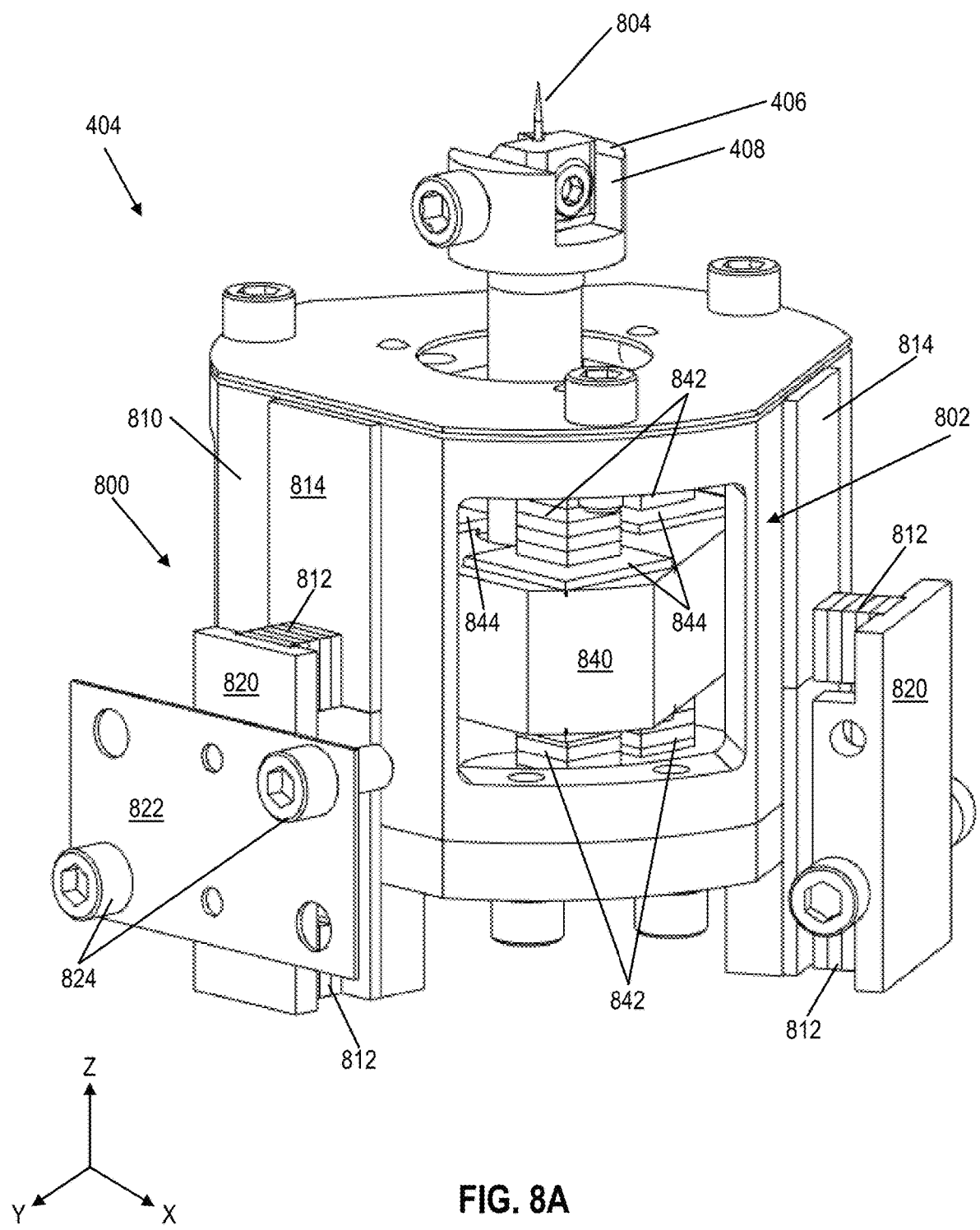
FIG. 8A and FIG. 8B show the coarse motors of the SPM head of FIG. 4A.
Figure 8B:
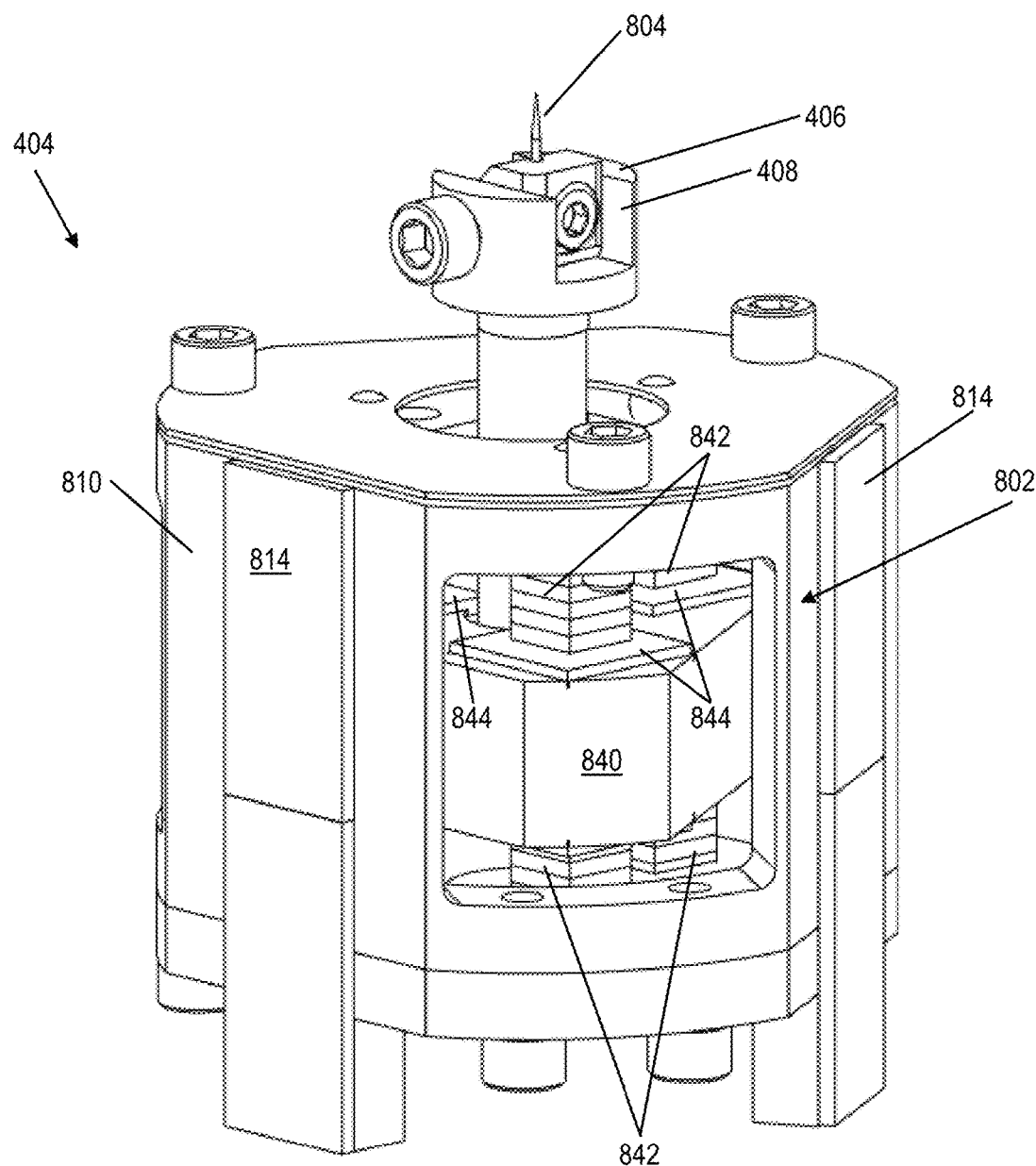

FIG. 8A and FIG. 8B show the coarse motors 404 of the SPM head 400 of FIG. 4A having a Z motor 800 and a combined XY motor 802 as represented in FIG. 2A and FIG. 2C. The coarse motors 404 are connected to the scanner 406, the probe receiver 408 and a probe 804.

The Z motor 800 is configured to move the combined XY motor 802 along the Z axis (a.k.a. Z direction). The Z motor 800 includes a Z body 810 configured to nest the combined XY motor 802 therein and Z piezo stacks 812 configured to move the Z body 810 along the Z axis. In this example embodiment, the Z body 810 includes Z sapphire plates 814 along which the Z piezo stacks 812 move (due to proper characteristics of the sapphire surface). The Z piezo stacks 812 are secured to a Z plate 820 which is, in turn, secured to an adjustable Z spring 822. (In an example embodiment, adjustable mounting springs such as the Z spring 822 comprise BeCu.) The Z spring 822 is secured via bolts 824 to the frame 402 (a.k.a. an external component). It is equally possible that the Z piezo stacks 812 could be secured to the Z body 810 and move along the Z plate 820.

The combined XY motor 802 is configured to move the probe 800 along both the X axis (a.k.a. X direction) and the Y axis (a.k.a. Y direction) (e.g. in a plane defined by the X axis and the Y axis). As used herein, the probe, the probe receiver, and/or the scanner can be referred to as a positionable component because they are positionable by the coarse motors. The combined XY motor 802 includes an XY body 840 secured to the probe 800 and XY piezo stacks 842 configured to selectively move the XY body 840 along the X axis and the Y axis. The XY piezo stacks 842 are secured to the Z body 810 and move along XY sapphire plates 844. It is equally possible that the XY piezo stacks 842 could be secured to the XY body 840 and move along the Z body 810.

FIG. 9A to FIG. 9F show an example embodiment of an SPM head 900 with an example embodiment of the coarse motors 902 in which the X motor 904, the Y motor 906, and the Z motor 908 are discrete as represented in FIG. 2B and FIG. 2D. Further, the Z motor 908 is nested in the Y motor 906 which is, in turn, nested in the X motor 904. A middle portion of the frame 920 is removed for clarity in FIG. 9A. The coarse motors 902 are connected to the scanner 922, the probe receiver 924 and a probe 926.

Opposite the probe 926 is a sample holder 928 with a sample holder Wobble stick handle 930 in a vertical sample receiver 932. (In this example embodiment, the probe 926 is positioned to the side of the sample holder 928 as opposed to under the sample holder 928.) FIG. 9B shows the sample holder 928 of FIG. 9A in greater detail. An SPM electrical connector 934 is visible below the coarse motors 902.

Figure 9A:
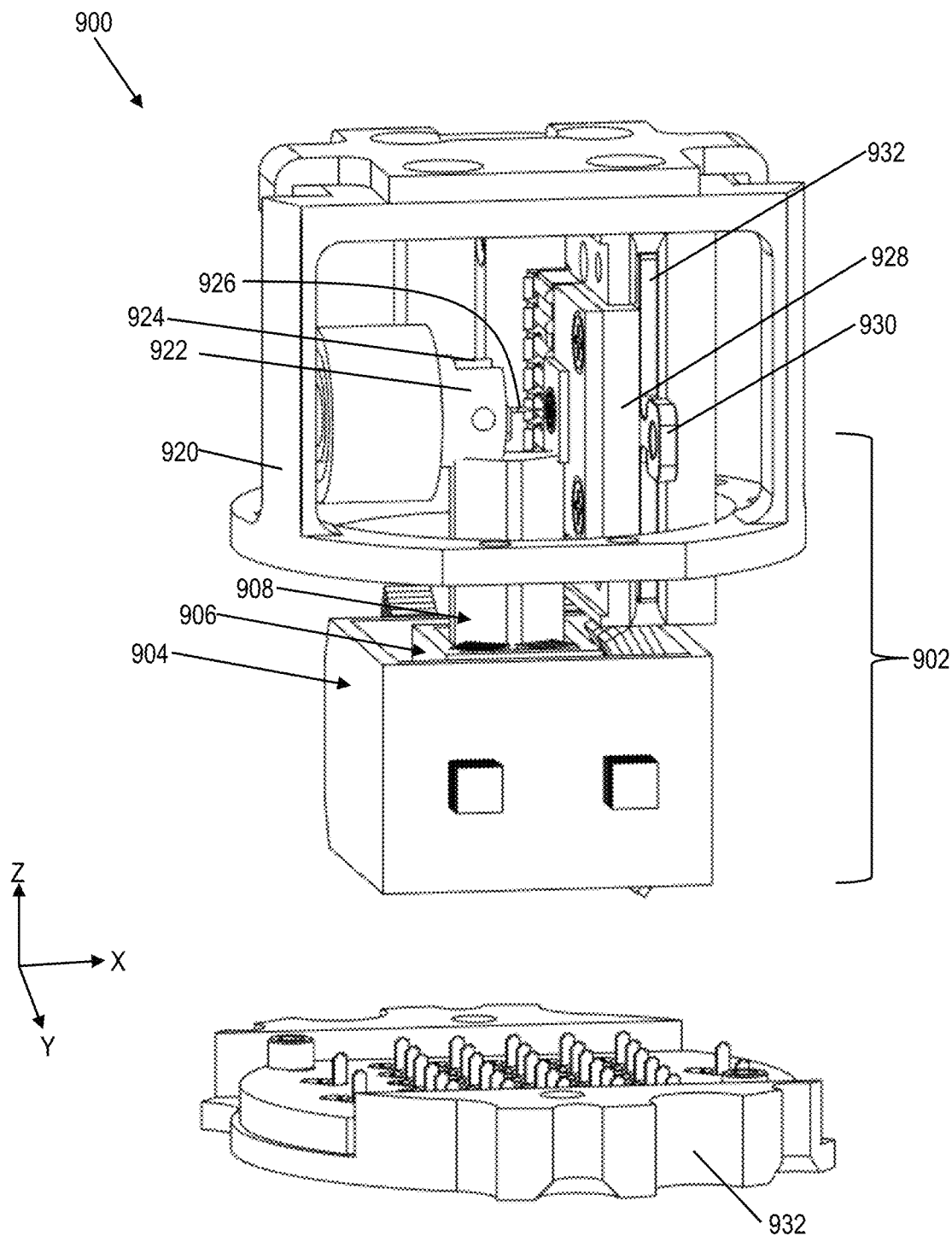
FIG. 9A shows an example embodiment of an SPM head with an example embodiment of the coarse motors having discrete, nested X, Y, and Z motors as represented in FIG. 2B and FIG. 2D.
Figure 9B:
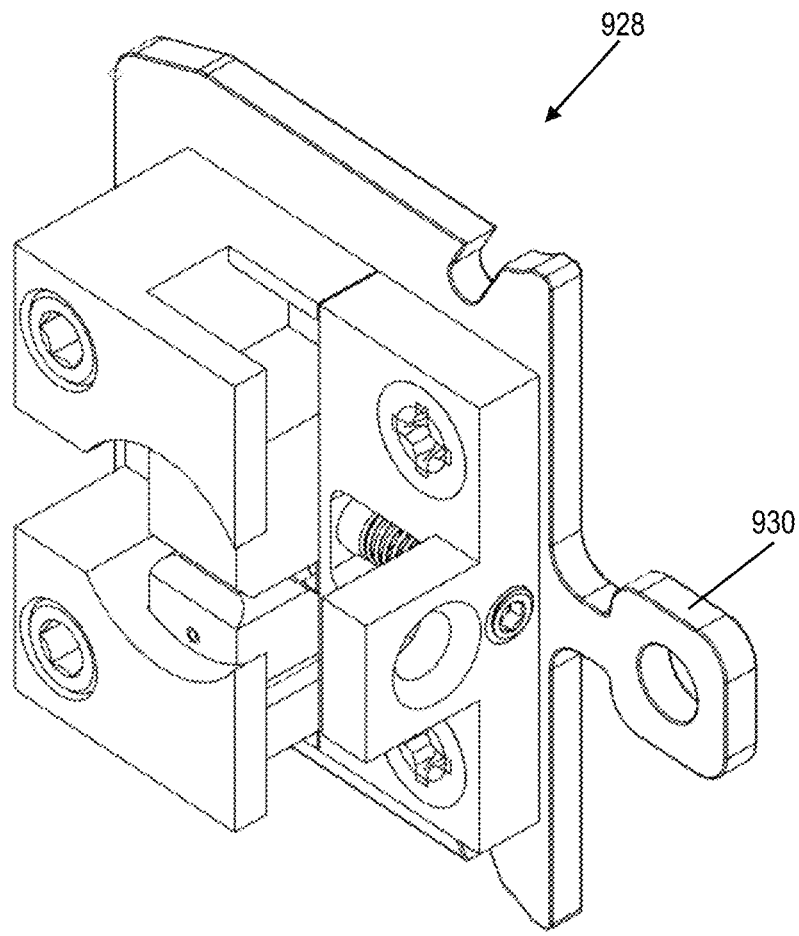
FIG. 9B shows an example embodiment of a sample holder for the SPM head of FIG. 9A.
Figure 9C:
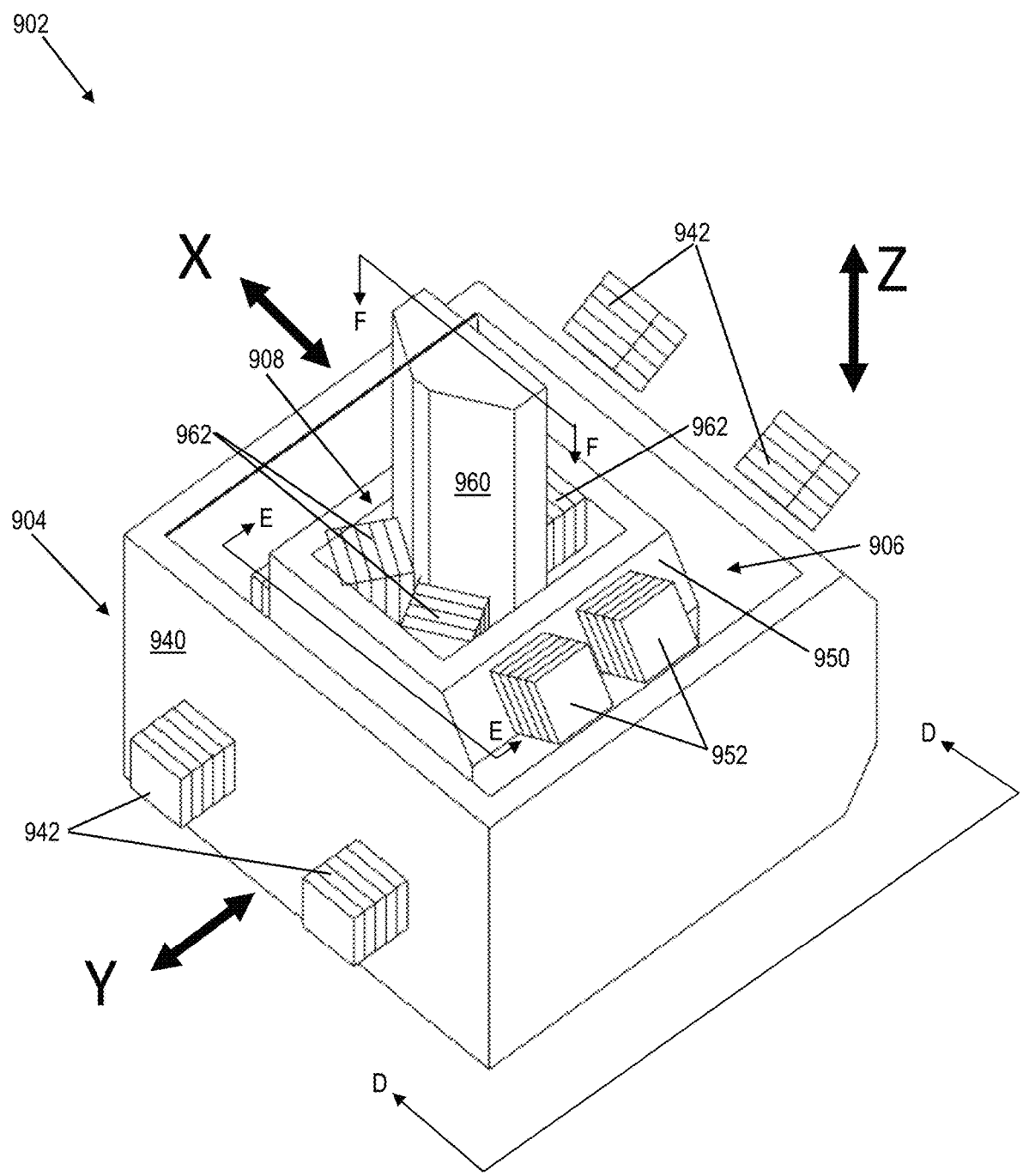
FIG. 9C schematically shows the coarse motors 902 of FIG. 9A in isolation.
Figure 10A:
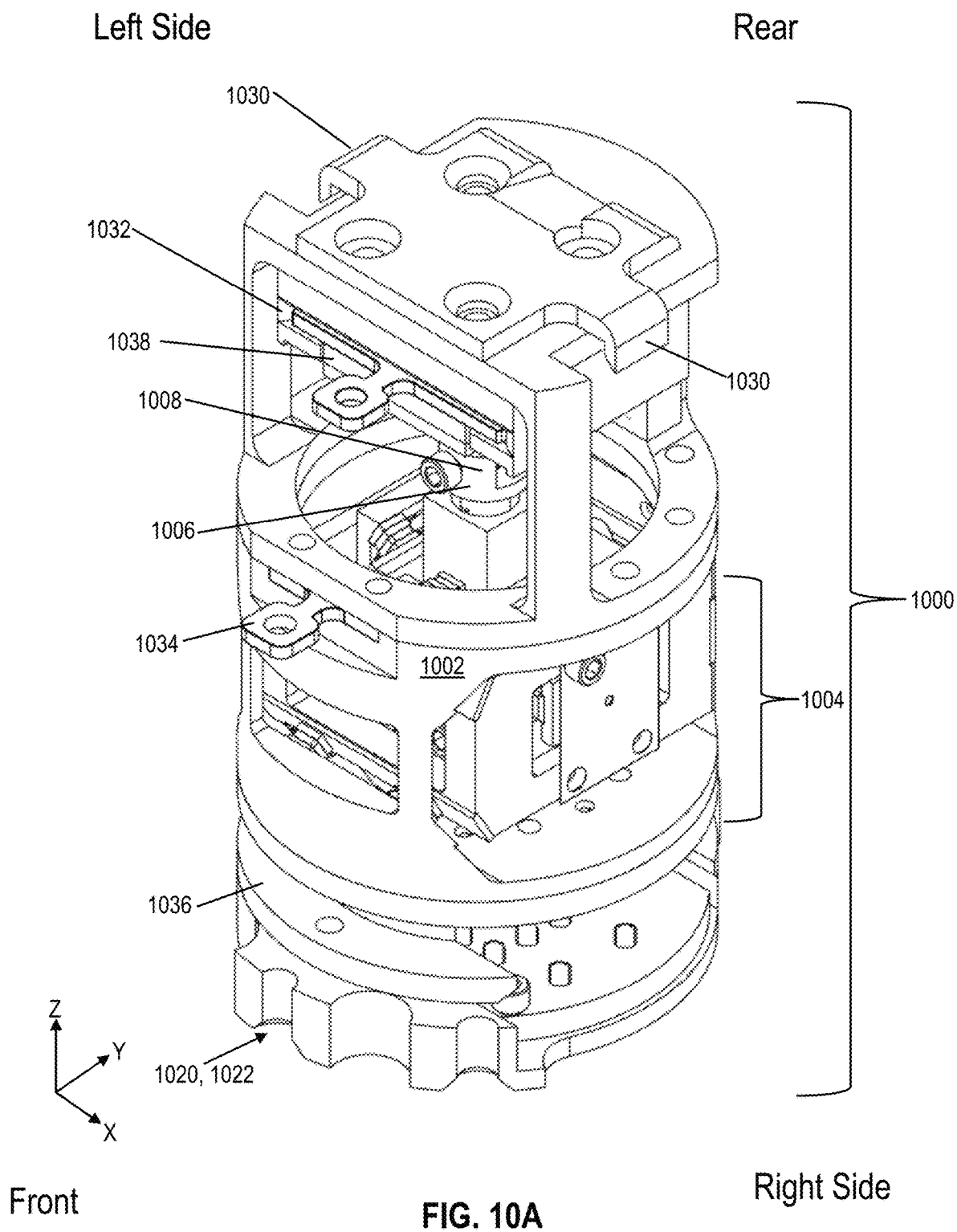
FIG. 10A shows an alternate example embodiment of an SPM head with an alternate example embodiment of the coarse motors having discrete, nested X, Y, and Z motors as represented in FIG. 2B and FIG. 2D.
Figure 10B:
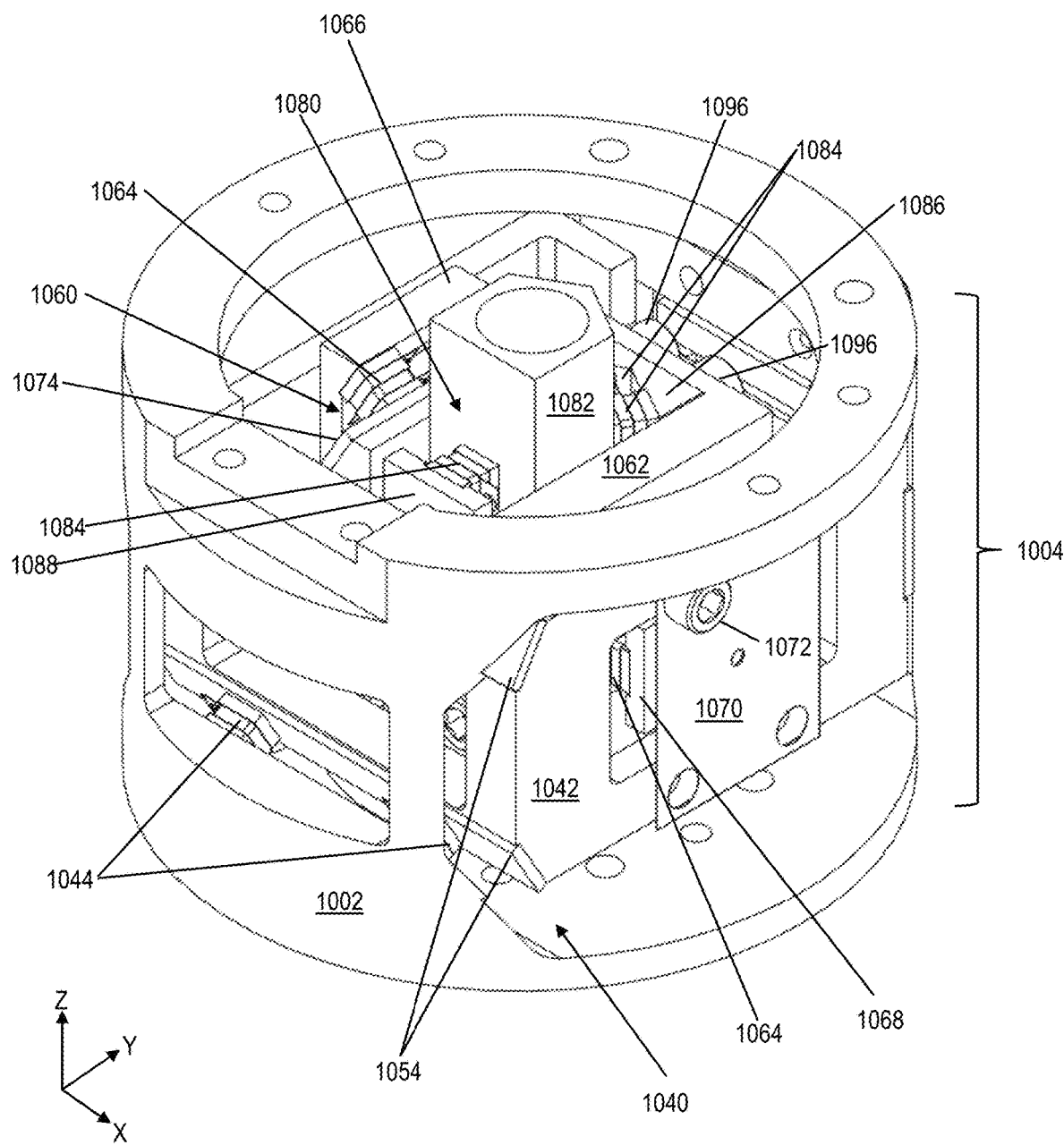
FIG. 10B shows the middle section of the SPM head of FIG. 10A with the coarse motors of FIG. 10A.
Figure 10C:
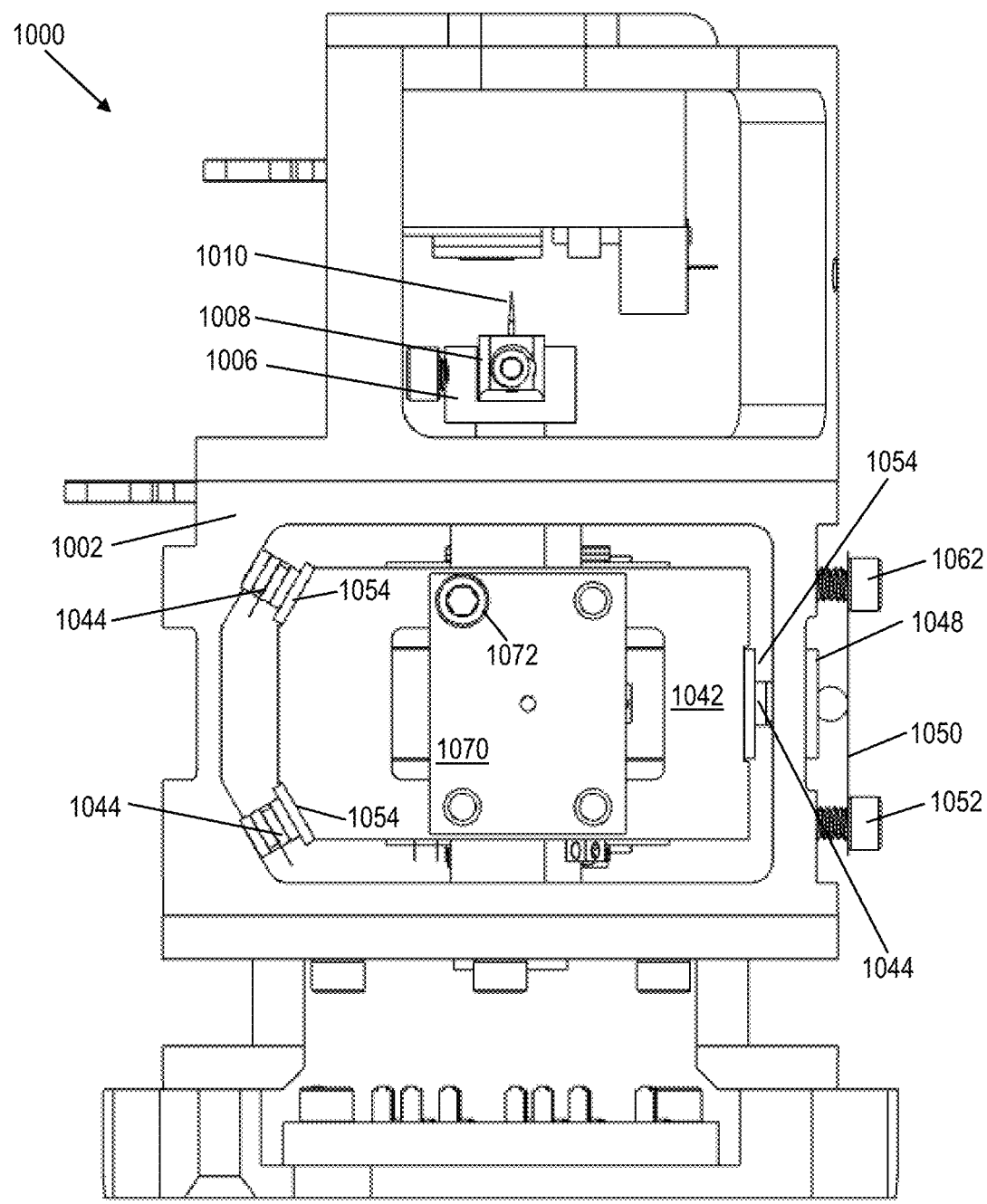
FIG. 10C is a right side view of the SPM head of FIG. 10A.
Figure 10D:
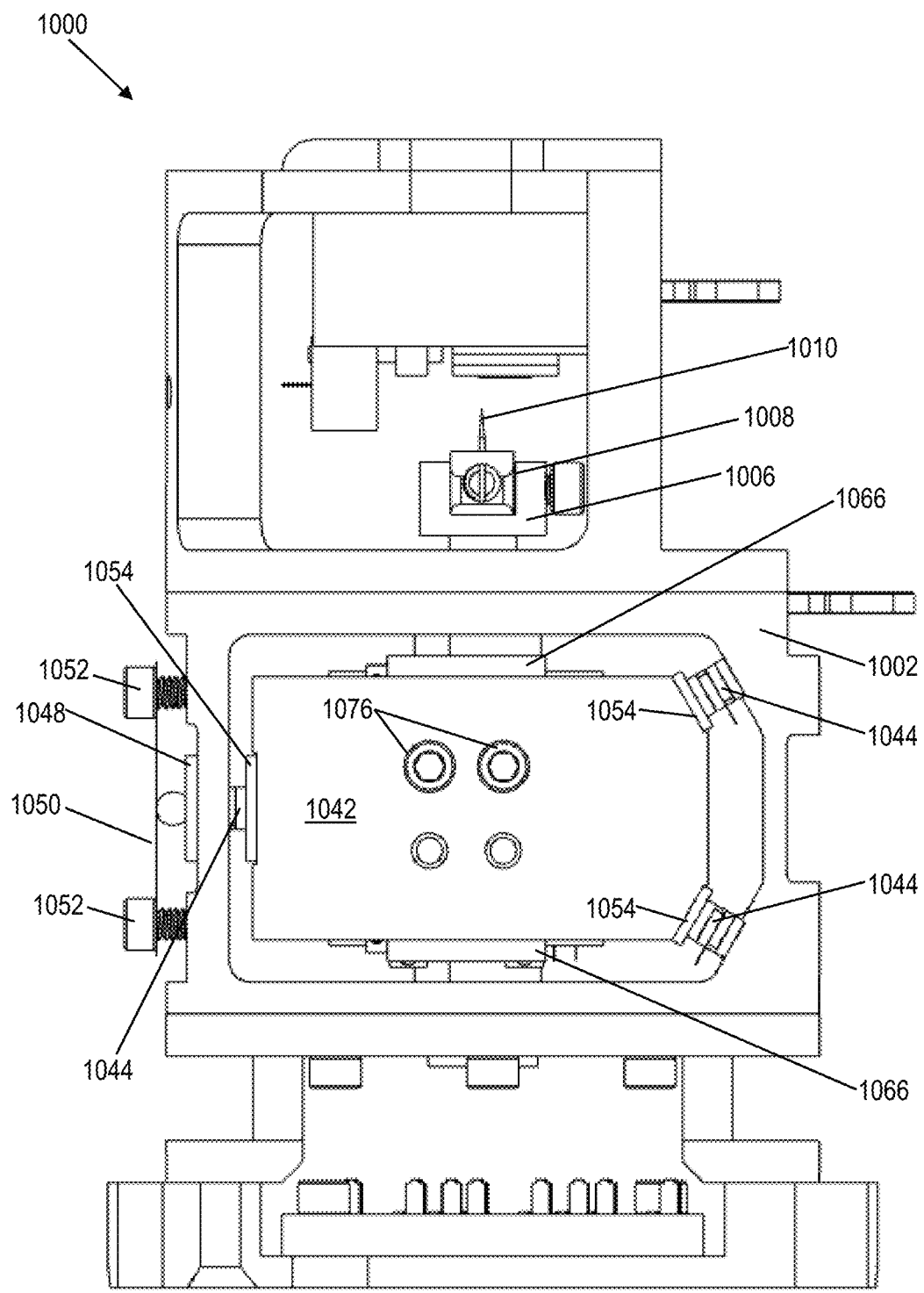
FIG. 10D is a left side view of the SPM head of FIG. 10A.
Figure 10E:
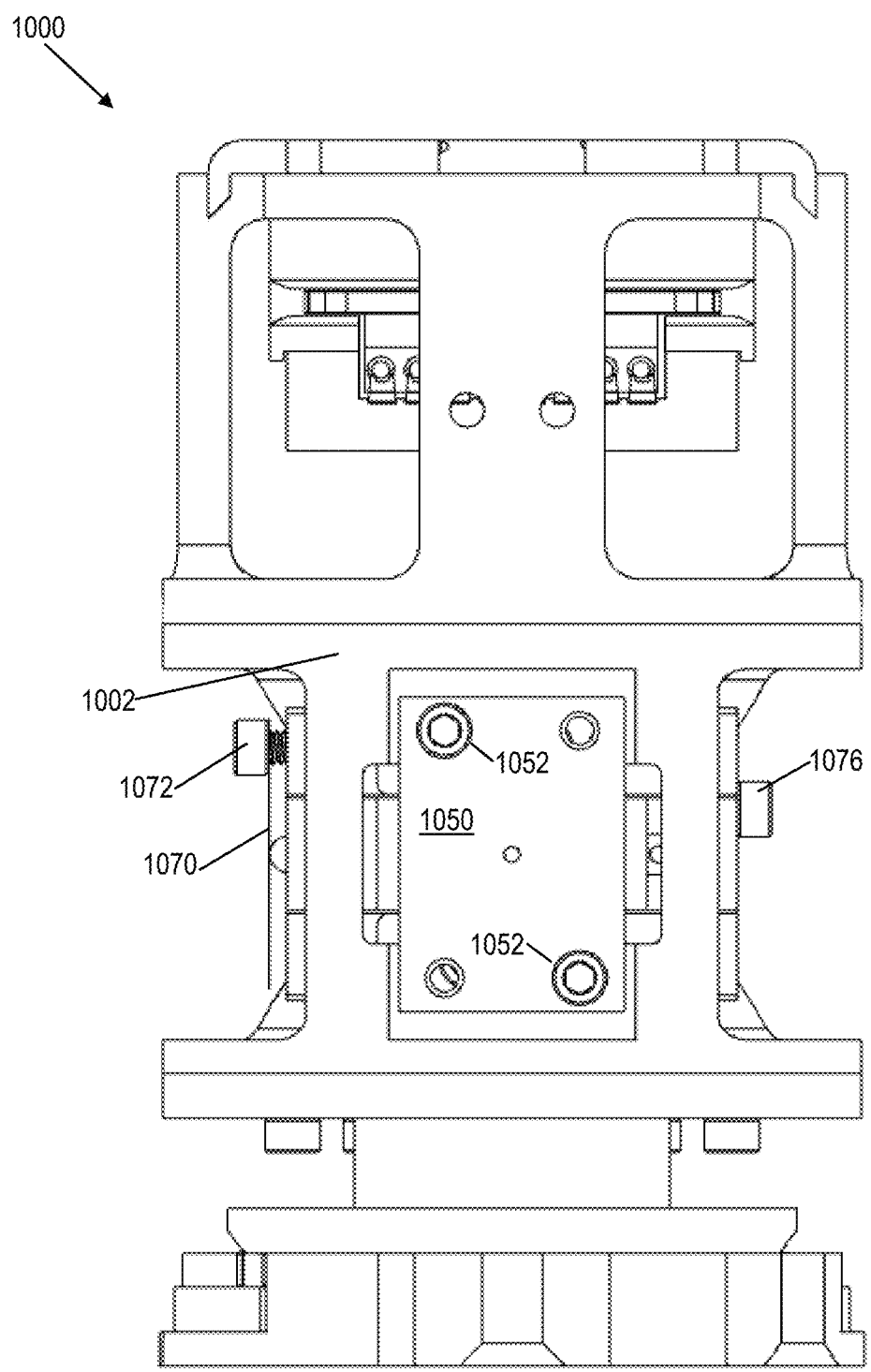
FIG. 10E is a rear view of the SPM head of FIG. 10A.
Figure 10F:
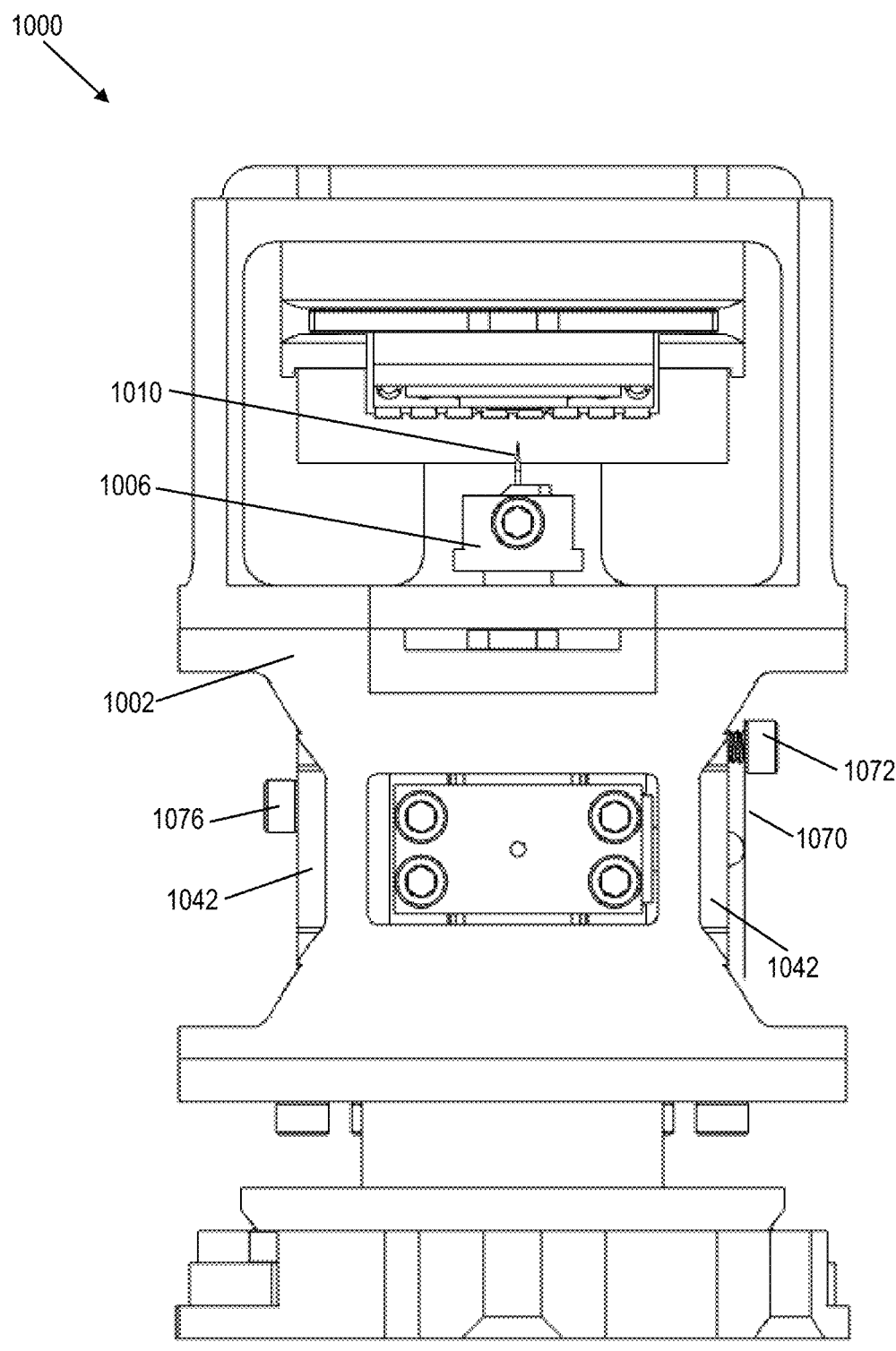
FIG. 10F is a front view of the SPM head of FIG. 10A.
Figure 10G:
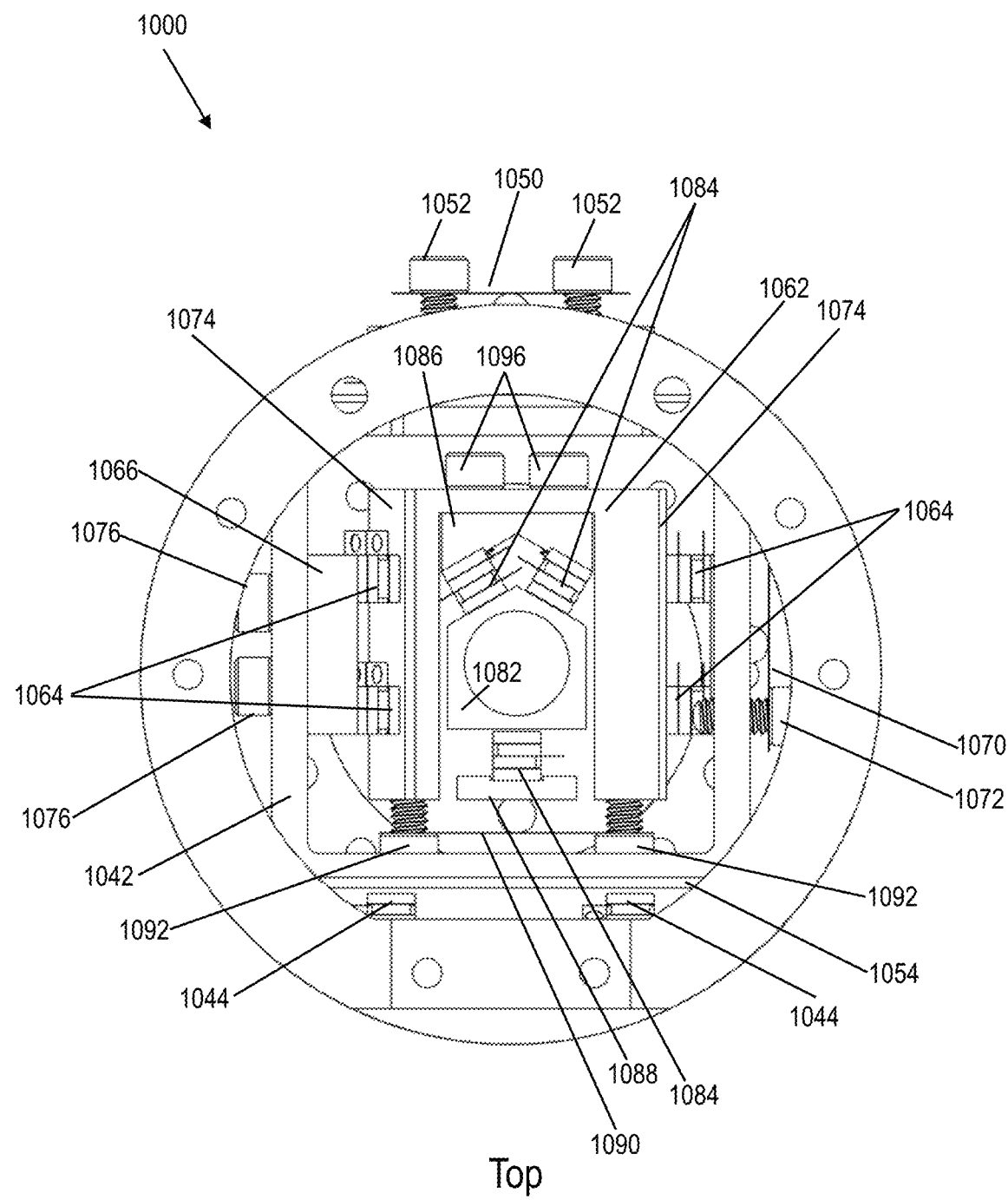
FIG. 10G is a top view of the SPM head of FIG. 10A.
Figure 10H:
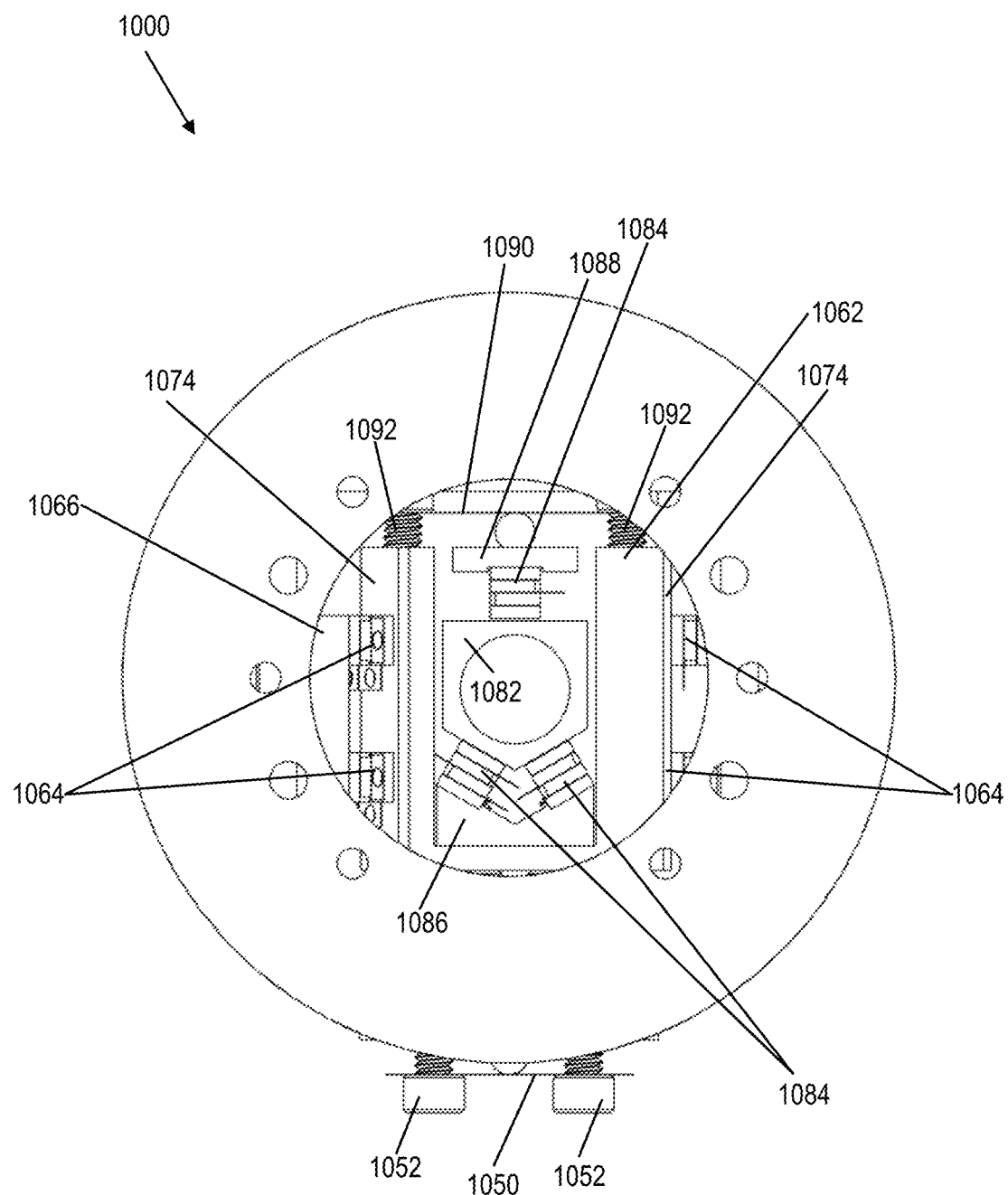
FIG. 10H is a bottom view of the SPM head of FIG. 10A.

FIG. 9C schematically shows the coarse motors 902 of FIG. 9A in isolation. The X motor 904 is configured to move along the X axis relative to the frame 920 (the external component) and includes an X body 940 and X piezo stacks 942. The X piezo stacks are in contact (direct or indirect) with the frame 920 and move the X body 940 in the X direction relative to the frame 920. The Y motor 906 is nested in the X motor 904, and the Z motor 908 is nested in the Y motor 906. Consequently, any X direction movement of the X motor 904 necessarily causes the same X movement in both the Y motor 906 and the Z motor 908.

The Y motor 906 is configured to move along the Y axis relative to the frame 920 (the external component) and includes a Y body 950 and Y piezo stacks 952. The Y piezo stacks 952 are in contact (direct or indirect) with the inside of the X body 940 and move the Y body 950 in the Y direction relative to the X body 940. The Z motor 908 is nested in the Y motor 906. Consequently, any Y direction movement of the Y motor 906 necessarily causes Y direction movement of the Z motor 908.

The Z motor 908 is configured to move along the Z axis relative to the frame 920 (the external component) and includes a Z body 960 and Z piezo stacks 962. The Z piezo stacks 962 are in contact (direct or indirect) with the inside of the Y body 950 and move the Z body 960 in the Z direction relative to the Y body 950.

The probe 926 is secured to the Z body 960. Hence, movement of the probe 926 in the Z direction is effected directly via the Z motor 908. The Z body 960 is secured to the Y body 950. Hence, movement of the probe 926 in the Y direction is effected indirectly by moving the Y body 950, which moves the Z body 960 and the probe 926 in the Y direction. The Y body 950 is secured to the X body 940. Hence, movement of the probe 926 in the X direction is effected indirectly by moving the X body 940 in the X direction. This moves the Y body 950 in the X direction, which moves the Z body 960 and the probe 926 in the X direction.

In the example embodiment of FIG. 9A, the coarse motors 902 are installed so that movement of the X motor 904 along the X axis moves the probe 926 toward and away from the sample being held in the sample holder 928. However, the coarse motors 902 can alternately be installed at ninety degrees (90°) (about the Z axis) so that movement of the X motor 904 along the X axis moves the probe 926 sideways (in and out of the page as shown in FIG. 9C). Hence, the coarse motors 902 can be installed so that the X axis defined by its movement is perpendicular to the sample holder 928, parallel to the sample holder 928, or at any angle in between.

FIG. 9D shows the X motor 904, the Y motor 906, and the Z motor 908 taken along D-D shown in FIG. 9C.

FIG. 9E shows the Y motor 906 and the Z motor 908 taken along E-E shown in FIG. 9C.

FIG. 9F shows the Z motor 908 taken along F-F shown in FIG. 9C.

FIG. 10A to FIG. 10H show an alternate example embodiment of an SPM head 1000. The SPM head 1000 includes a frame 1002 and within the frame 1002 includes the coarse motors 1004, the scanner 1006, the probe receiver 1008, and the probe 1010. (In this example embodiment, the probe would be positioned under the sample holder.) The SPM head 1000 further includes an SPM electrical connector 1020 that forms the second half 1022 of the universal electrical connection between the SPM head 1000 and the base (not shown), which has a base electrical connector that form the first half of the universal electrical connection. The SPM head 1000 further includes transfer handles 1030 suitable for use with a transfer mechanism, a horizontal sample receiver 1032 suitable for receiving a sample holder 1038, a SPM Wobble stick handle 1034 suitable for being grabbed by a Wobble stick, and a groove 1036 suitable for receiving a robotic arm fork.

In this example embodiment, the X motor 1040, the Y motor 1060, and the Z motor 1080 are discrete as represented in FIG. 2B and FIG. 2D. Further, the Z motor 1080 is nested in the Y motor 1060 which is, in turn, nested in the X motor 1040.

The X motor 1040 is configured to move along the X axis relative to the frame 1002 (the external component) and includes an X body 1042 and X piezo stacks 1044. The X piezo stacks are in contact (direct or indirect) with the frame 1002 and move the X body 1042 in the X direction relative to the frame 1002. In this example embodiment, the angled X piezo stacks 1044 are secured (directly or indirectly) to the frame 1002 and the opposite X piezo stacks 1044 are secured (directly or indirectly) to an X plate 1048 which is, in turn, secured to an adjustable X spring 1050. The X spring 1050 is secured via bolts 1052 to the frame 1002 (a.k.a. the external component). Sapphire plates 1054 are secured to the X body 1042 under the X piezo stacks 1044. The X piezo stacks 1044 move along their respective sapphire plates 1054 to effect the movement in the X direction. It is equally possible that the X piezo stacks 1044 could be secured to the X body 1042 and move along the frame 1002 and the X plate 1048 (with or without associated sapphire plates). The Y motor 1060 is nested in the X motor 1040, and the Z motor 1080 is nested in the Y motor 1060. Consequently, any X direction movement of the X motor 1040 necessarily causes the same X movement in both the Y motor 1060 and the Z motor 1080.

The Y motor 1060 is configured to move along the Y axis relative to the frame 1002 (the external component) and includes a Y body 1062 and Y piezo stacks 1064. The Y piezo stacks 1064 are in contact (direct or indirect) with the inside of the X body 1042 and move the Y body 1062 in the Y direction relative to the X body 1042. In this example embodiment, the angled Y piezo stacks 1064 are secured (directly or indirectly) to an adjustable, cooperatively angled Y plate 1066 that is secured (directly or indirectly) via bolts 1076 to the inside of the X body 1042. The opposite Y piezo stacks 1064 are secured (directly or indirectly) to a Y plate 1068 which is, in turn, secured to an adjustable Y spring 1070. The Y spring 1070 is secured via bolts 1072 to the X body 1042. Sapphire plates 1074 are secured to the Y body 1062 under the Y piezo stacks 1064. The Y piezo stacks 1064 move along their respective sapphire plates 1074 to effect the movement in the Y direction. It is equally possible that the Y piezo stacks 1064 could be secured to the Y body 1062 and move along the angled Y plate 1066 and the Y plate 1068 (with or without associated sapphire plates). The Z motor 1080 is nested in the Y motor 1060. Consequently, any Y direction movement of the Y motor 1060 necessarily causes Y direction movement of the Z motor 1080.

The Z motor 1080 is configured to move along the Z axis relative to the frame 1002 (the external component) and includes a Z body 1082 and Z piezo stacks 1084. The Z piezo stacks 1084 are in contact (direct or indirect) with the inside of the Y body 1062 and move the Z body 1082 in the Z direction relative to the Y body 1062. In this example embodiment, the angled Z piezo stacks 1084 are secured (directly or indirectly) to an adjustable, cooperatively angled Z plate 1086 that is secured (directly or indirectly) via bolts 1096 to the inside of the Y body 1062. The opposite Z piezo stacks 1084 are secured (directly or indirectly) to a Z plate 1088 which is, in turn, secured to an adjustable Z spring 1090. The Z spring 1090 is secured via bolts 1092 to the Y body 1062. Sapphire plates may optionally be secured to the Z body 1082 under the Z piezo stacks 1084. The Z piezo stacks 1084 move the Z body 1082 in the Z direction. It is equally possible that the Z piezo stacks 1084 could be secured to the Z body 1082 and move along the angled Z plate 1086 and the Z plate 1088 (with or without associated sapphire plates).

The probe 1010 is secured to the Z body 1082. Hence, movement of the probe 1010 in the Z direction is effected directly via the Z motor 1080. The Z body 1082 is secured to the Y body 1062. Hence, movement of the probe 1010 in the Y direction is effected indirectly by moving the Y body 1062, which moves the Z body 1082 and the probe 1010 in the Y direction. The Y body 1062 is secured to the X body 1042. Hence, movement of the probe 1010 in the X direction is effected indirectly by moving the X body 1042 in the X direction. This moves the Y body 1062 in the X direction, which moves the Z body 1082 and the probe 1010 in the X direction.

As with the example embodiment of FIG. 9C, the coarse motors 1004 can be installed at any desired clocking position about the Z axis.

To demonstrate the effectiveness of the STM head disclosed here, the SPM system 202 (with STM head) was placed on a table with no vibration isolation and the scans were performed at room temperature in atmospheric pressure. FIG. 11A shows a large area scan showing terraces of the graphite. FIG. 11B shows an atomic resolution scan. The STM system was able to produce a large area scan of highly oriented pyrolytic graphite (HOPG) showing the terraces of graphite as well as achieve atomic resolution to observe the graphite Carbon atoms. The fact that the STM system can achieve atomic resolution without vibration isolation is a proof that the compact and rigid design is significantly less susceptible to vibrational noise.

3. Alternatives, Deviations and Modifications

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article.

What is claimed is:

1. An apparatus, comprising:
a scanning probe microscope head comprising a frame configured to fit within an insert of a cryostat, and a probe, a scanner, and a sample holder all disposed within the frame;
a coarse motor assembly disposed within the frame and comprising:
a positionable component; and
coarse motors, wherein the coarse motors comprise:
a first motor operatively associated with the frame and configured to move the positionable component along a first axis relative to the frame; and
at least one further motor nested inside the first motor and configured to move the positionable component along a second axis and along a third axis relative to the frame, wherein movement along the first axis effected by the first motor moves the at least one further motor nested therein along the first axis; and
a universal electrical base connection comprising half of a plug/socket arrangement, wherein the plug/socket arrangement is configured to provide electrical communication between the scanning probe microscope head and a base which comprises a second half of the plug/socket arrangement when the scanning probe microscope head is lowered onto the base.

2. The apparatus of claim 1, further comprising a top plate disposed atop the frame and configured to cooperate with hooks of a tool configured to transport the scanning probe microscope head.

3. The apparatus of claim 1, wherein the frame comprises a recess configured to receive a robotic arm fork.

4. The apparatus of claim 1, further comprising a flag handle configured to cooperate with a wobble stick.

5. The apparatus of claim 1, wherein the at least one further motor comprises a combined second/third motor configured to move the positionable component in a plane defined by the second axis and the third axis.

6. The apparatus of claim 5, further comprising an adjustable mount configured to secure the coarse motor assembly to the frame.

7. The apparatus of claim 1, wherein the at least one further motor comprises:
a third motor secured to the positionable component and configured to move the positionable component along the third axis; and
a second motor functionally between the first motor and the third motor and configured to move the third motor along the second axis.

8. The apparatus of claim 1, wherein the plug/socket arrangement comprises a plurality of female receptacles disposed in a pattern on a bottom of the scanning probe microscope head, each female receptacle of the plurality of female receptacles being configured to receive a respective male pin of a plurality of male pins disposed in the pattern on a top of the base.

9. The apparatus of claim 8, wherein at least one female socket of the plurality of female sockets further comprises a respective spring contact.

10. An apparatus, comprising:
a scanning probe microscope head comprising a frame configured to fit within an insert of a cryostat, and a probe, a scanner, and a sample holder all disposed within the frame; and
a universal electrical base connection comprising half of a plug/socket arrangement, wherein the plug/socket arrangement is configured to provide electrical communication between the scanning probe microscope head and a base which comprises a second half of the plug/socket arrangement when the scanning probe microscope head is lowered onto the base.

11. The apparatus of claim 10, wherein the plug/socket arrangement comprises a plurality of female sockets disposed in a pattern on a bottom of the scanning probe microscope head, each female socket of the plurality of female sockets being configured to receive a respective male pin of a plurality of male pins disposed in the pattern on a top of the base.

12. The apparatus of claim 11, wherein at least one female socket of the plurality of female sockets further comprises a respective spring contact.

13. The apparatus of claim 10, further comprising coarse motor assembly disposed within the frame and configured to move a positionable component relative to the frame along an X axis, a Y axis, and a Z axis.

14. The apparatus of claim 13, wherein the coarse motor assembly comprises: a first motor operatively associated with the frame and configured to move the positionable component along a first axis relative to the frame; and at least one further motor nested inside the first motor and configured to move the positionable component along a second axis and along a third axis relative to the frame, wherein movement along the first axis effected by the first motor moves the at least one further motor nested therein along the first axis.

15. An apparatus, comprising:
a scanning probe microscope coarse motor assembly, comprising:
a positionable component; and
coarse motors configured to be operatively associated with an external component and configured to move the positionable component along an X axis, along a Y axis, and along a Z axis relative to the external component and within the external component;
wherein the external component comprises a frame of a scanning probe microscope configured to fit within an insert of a cryostat.

16. The apparatus of claim 15, wherein the coarse motors comprise:
a combined XY motor configured to move the positionable component in a plane defined by the X axis and the Y axis, and
a Z motor configured to move the combined XY motor along the Z axis.

17. The apparatus of claim 16, wherein the combined XY motor comprises an XY body secured to the positionable component and an XY piezo stack configured to selectively move the XY body in the plane defined by the X axis and the Y axis.

18. The apparatus of claim 17, wherein the Z motor comprises a Z body configured to nest the XY body therein and a Z piezo stack configured to move the Z body along the Z axis.

19. The apparatus of claim 16, wherein the Z motor is operatively associated with the external component.

20. The apparatus of claim 15, wherein the coarse motors comprise:
a Z motor configured to move the positionable component along the Z axis; and
a Y motor configured to move the Z motor along the Y axis.

21. The apparatus of claim 20, wherein the Z motor is secured to the positionable component, wherein the Y motor comprises a Y body secured to the Z motor and a Y piezo stack configured to move the Y body along the Y axis.

22. The apparatus of claim 20, wherein the coarse motors comprise:
an X motor configured to move the Z motor along the X axis.

23. The apparatus of claim 20, wherein the coarse motors comprise:
an X motor configured to move the Y motor along the X axis.

24. The apparatus of claim 23, wherein the Z motor is secured to the positionable component, wherein the Y motor comprises a Y body secured to the Z motor and a Y piezo stack configured to move the Y body along the Y axis, wherein the X motor comprises an X body secured to the Y motor and an X piezo stack configured to move the X body along the X axis.

25. The apparatus of claim 24, wherein the X motor is operatively associated with the external component.

26. An apparatus, comprising:
a scanning probe microscope coarse motor assembly, comprising:
a positionable component; and
coarse motors comprising: a first motor operatively associated with an external component and configured to move the positionable component along a first axis relative to the external component and within the external component; and at least one further motor nested inside the first motor and configured to move the positionable component along a second axis and along a third axis relative to the external component; wherein movement along the first axis effected by the first motor moves the at least one further motor nested therein along the first axis.

27. The apparatus of claim 26, wherein the at least one further motor comprises a combined second/third motor configured to move the positionable component in a plane defined by the second axis and the third axis.

28. The apparatus of claim 26, wherein the at least one further motor comprises:
a third motor secured to the positionable component and configured to move the positionable component along the third axis; and
a second motor functionally between the first motor and the third motor and configured to move the third motor along the second axis.

29. An apparatus, comprising:
a scanning probe microscope coarse motor assembly, comprising:
a positionable component; and
coarse motors configured to be operatively associated with an external component and comprising a Z piezo stack configured to move the positionable component along a Z axis relative to the external component, and at least one piezo stack configured to move the positionable component along an X axis and along a Y axis relative to the external component.

30. The apparatus of claim 29, wherein the at least one piezo stack comprises an XY piezo stack configured to move the positionable component in a plane defined by the X axis and the Y axis.

31. The apparatus of claim 30, wherein the XY piezo stack is secured to the positionable component, and wherein the Z piezo stack is secured to the external component and configured to move the XY piezo stack along the Z axis.

32. The apparatus of claim 29, wherein the Z piezo stack is secured to the positionable component, wherein the at least one piezo stack comprises: a Y piezo stack configured to move the Z piezo stack along the Y axis; and an X piezo stack secured to the external component and configured to move the Y piezo stack along the X axis.

* * * * *